US011375549B2

(12) United States Patent
Lei et al.

(10) Patent No.: US 11,375,549 B2
(45) Date of Patent: Jun. 28, 2022

(54) LEVERAGING POSITIONING REFERENCE SIGNAL AND POSITIONING MEASUREMENTS TO ENHANCE RANDOM ACCESS

(71) Applicant: QUALCOMM Incorporated, San Diego, CA (US)

(72) Inventors: Jing Lei, San Diego, CA (US); Alexandros Manolakos, San Diego, CA (US); Linhai He, San Diego, CA (US); Joseph Binamira Soriaga, San Diego, CA (US); Tingfang Ji, San Diego, CA (US); Ying Wang, San Diego, CA (US); Seyong Park, San Diego, CA (US); Jay Kumar Sundararajan, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 144 days.

(21) Appl. No.: 16/773,949

(22) Filed: Jan. 27, 2020

(65) Prior Publication Data

US 2020/0245372 A1    Jul. 30, 2020

Related U.S. Application Data

(60) Provisional application No. 62/797,913, filed on Jan. 28, 2019.

(51) Int. Cl.
*H04W 4/00*    (2018.01)
*H04W 74/08*    (2009.01)
(Continued)

(52) U.S. Cl.
CPC ....... *H04W 74/0833* (2013.01); *H04L 5/0048* (2013.01); *H04W 72/042* (2013.01); *H04W 72/0413* (2013.01)

(58) Field of Classification Search
CPC ......... H04W 74/0833; H04W 72/0413; H04W 72/042; H04L 5/0048
(Continued)

(56) References Cited

U.S. PATENT DOCUMENTS

2019/0045566 A1 *   2/2019   Wu ................... H04W 74/0833
2020/0092768 A1 *   3/2020   Amuru .............. H04W 36/0072
(Continued)

FOREIGN PATENT DOCUMENTS

| WO | 2018060340 A1 | 4/2018 |
| WO | 2018124675 A1 | 7/2018 |
| WO | WO-2018182385 A1 * | 10/2018 | .......... H04W 74/008 |

OTHER PUBLICATIONS

Nokia (R1-1901192, "On 2-step Random Access Procedure", Taipei, Taiwan, Jan. 21-25, 2019). (Year: 2019).*
(Continued)

*Primary Examiner* — Maharishi V Khirodhar

(57) ABSTRACT

Aspects of the present disclosure provide techniques and apparatus for wireless communication. In one aspect, a method may be performed by a wireless device such as a user equipment (UE) and generally includes: receiving at least one downlink (DL) signal from one or more base stations or transmitting at least one uplink (UL) positioning reference signal (PRS), the received at least one DL signal comprising: at least one DL PRS, at least one synchronization signal block (SSB), at least one system information block (SIB), at least one other reference signal comprising a channel state information reference signal (CSI-RS), or a combination thereof, wherein at least one measurement is performed based, at least in part, on the received at least one
(Continued)

DL signal or the transmitted at least one UL PRS; and performing at least one adjustment for random access based, at least in part, on the at least one measurement.

27 Claims, 18 Drawing Sheets

(51) Int. Cl.
  *H04W 72/04* (2009.01)
  *H04L 5/00* (2006.01)
(58) Field of Classification Search
  USPC .......................................................... 370/329
  See application file for complete search history.

(56) References Cited

U.S. PATENT DOCUMENTS

2020/0344815 A1* 10/2020 Svedman .............. H04L 5/0091
2021/0195532 A1* 6/2021 Ouchi ................. H04W 52/146

OTHER PUBLICATIONS

Nokia (R1-1901027, "Idle and Inactive mode positioning for NR", Taipei, Taiwan, Jan. 21-25, 2019). (Year: 2019).*
Huawei, HiSilicon (R1-1900036, Taipei, Jan. 21 -25, 2019,Downlink based solutions for NR positioning). (Year: 2019).*
International Search Report and Written Opinion—PCT/US2020/015494—ISA/EPO—dated Apr. 8, 2021.
ZTE Corporation: "RACH Configuration and BWPs", 3GPP TSG-RAN WG2 Meeting #102, 3GPP Draft; R2-1808322—RACH Configuration and BWPS, 3rd Generation Partnership Project (3GPP), Mobile Competence Centre; 650, Route Des Lucioles; F-06921 Sophia-Antipolis Cedex; France, vol. RAN WG2, No. Busan, South Korea; May 20, 2018 (May 20, 2018), 7 Pages, XP051444600, Retrieved from the Internet: URL: http://www.3gpp.org/ftp/Meetings%5F3GPP%5FSYNC/RAN2/Docs/ [retrieved on May 20, 2018] p. 1, paragraph 2.

* cited by examiner

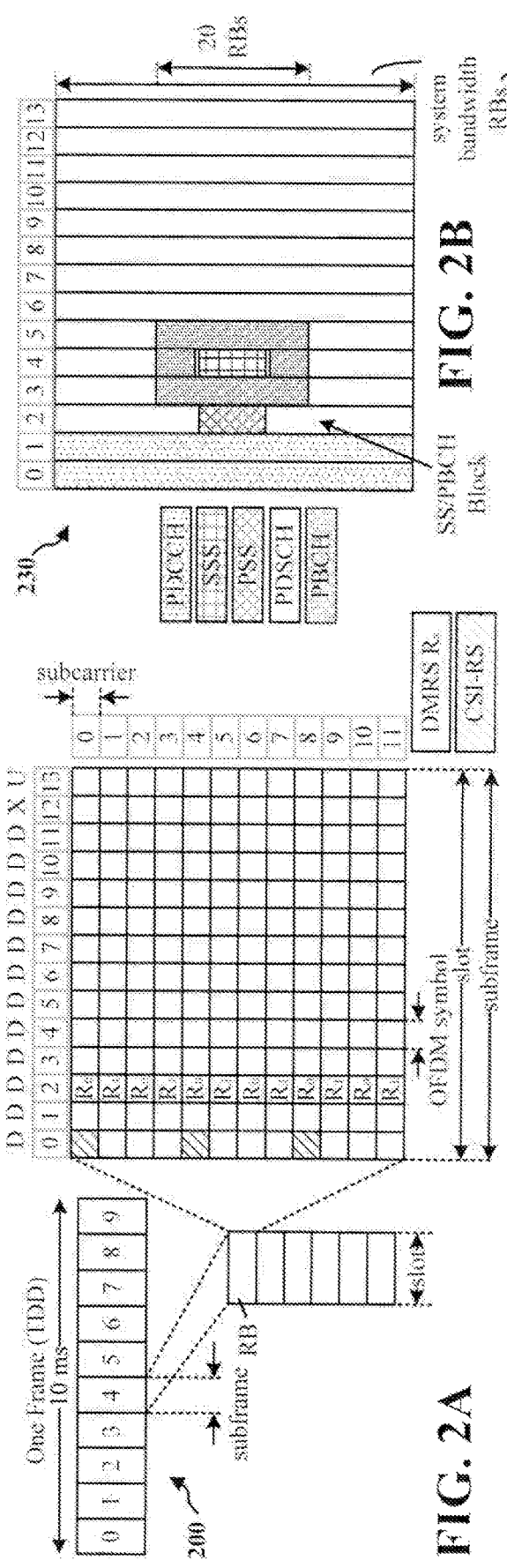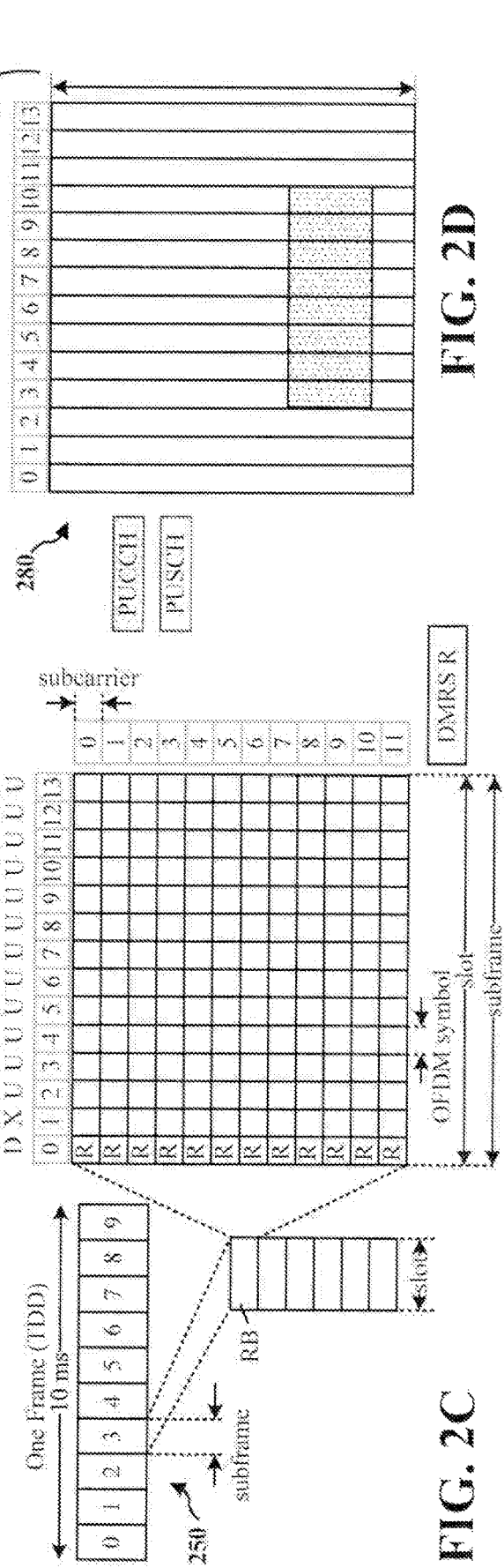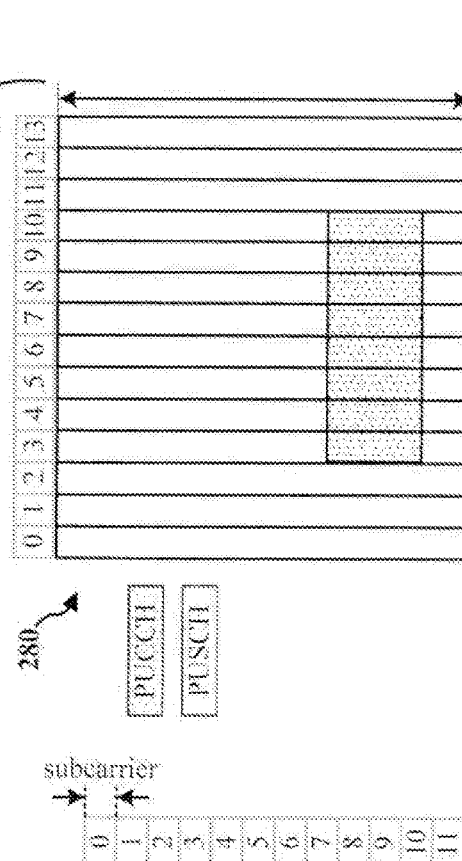

1800

1802 — transmit at least one downlink (DL) signal to a user equipment (UE) or receiving at least one uplink (UL) positioning reference signal (PRS) from the UE, the transmitted at least one DL signal comprising: at least one positioning reference signal (PRS), at least one synchronization signal block (SSB), at least one system information block (SIB), at least one other reference signal comprising a channel state information reference signal (CSI-RS), or a combination thereof, wherein at least one measurement is performed based, at least in part, on the at least one DL signal or the at least one UL PRS, and wherein the UE performs at least one adjustment for random access with the BS based, at least in part, on the at least one measurement

FIG. 18

LEVERAGING POSITIONING REFERENCE SIGNAL AND POSITIONING MEASUREMENTS TO ENHANCE RANDOM ACCESS

CROSS REFERENCE TO RELATED APPLICATIONS

This application for patent claims priority to U.S. provisional application No. 62/797,913, filed Jan. 28, 2019, which is hereby incorporated by reference in its entirety.

TECHNICAL FIELD

The present disclosure relates generally to wireless communications, and more particularly, to leveraging positioning reference signal and positioning measurements to enhance random access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, methods, computer-readable media, and apparatuses are provided. The apparatuses may be user equipment (UE) or a base station. Certain aspects of the present disclosure provide a method for wireless communication, performed by a wireless device, such as a user equipment (UE). The method generally includes: receiving at least one downlink (DL) signal from one or more base stations or transmitting at least one uplink (UL) positioning reference signal (PRS), the received at least one DL signal comprising: at least one DL PRS, at least one synchronization signal block (SSB), at least one system information block (SIB), at least one other reference signal comprising a channel state information reference signal (CSI-RS), or a combination thereof, wherein at least one measurement is performed based, at least in part, on the received at least one DL signal or the transmitted at least one UL PRS; and performing at least one adjustment for random access based, at least in part, on the at least one measurement.

Certain aspects of the present disclosure provide an apparatus for wireless communication. The apparatus may be a UE and may generally include at least one processor, memory coupled (electronically, operatively, communicatively, or otherwise) to the at least one processor, the memory comprising instructions executable (e.g., directly, or after compiling, converting, interpreting, etc.) by the at least one processor to cause the apparatus to: receive at least one downlink (DL) signal from one or more base stations or transmitting at least one uplink (UL) positioning reference signal (PRS), the received at least one DL signal comprising: at least one DL PRS, at least one synchronization signal block (SSB), at least one system information block (SIB), at least one other reference signal comprising a channel state information reference signal (CSI-RS), or a combination thereof, wherein at least one measurement is performed based, at least in part, on the received at least one DL signal or the transmitted at least one UL PRS; and perform at least one adjustment for random access based, at least in part, on the at least one measurement.

Certain aspects of the present disclosure provide for an apparatus for wireless communication. The apparatus may be a UE and may generally include: means for receiving at least one downlink (DL) signal from one or more base stations or transmitting at least one uplink (UL) positioning reference signal (PRS), the received at least one DL signal comprising: at least one DL PRS, at least one synchronization signal block (SSB), at least one system information block (SIB), at least one other reference signal comprising a channel state information reference signal (CSI-RS), or a combination thereof, wherein at least one measurement is performed based, at least in part, on the received at least one DL signal or the transmitted at least one UL PRS; and means for performing at least one adjustment for random access based, at least in part, on the at least one measurement.

Certain aspects of the present disclosure provide for a computer-readable medium for wireless communication by a wireless device, such as a UE. The computer-readable medium generally includes code, which when executed (e.g., directly, or after compiling, converting, interpreting, etc.) by at least one processor, causes the UE to: receive at least one downlink (DL) signal from one or more base stations or transmitting at least one uplink (UL) positioning reference signal (PRS), the received at least one DL signal comprising: at least one DL PRS, at least one synchronization signal block (SSB), at least one system information block (SIB), at least one other reference signal comprising a channel state information reference signal (CSI-RS), or a combination thereof, wherein at least one measurement is performed based, at least in part, on the received at least one DL signal or the transmitted at least one UL PRS; and perform at least one adjustment for random access based, at least in part, on the at least one measurement.

In an aspect of the disclosure, methods, computer-readable media, and apparatuses are provided. The apparatuses may be user equipment (UE) or a base station. Certain aspects of the present disclosure provide a method for wireless communication, performed by a wireless device, such as a user equipment (UE). The method generally includes: receiving at least one downlink (DL) signal from one or more base stations, wherein the received at least one DL signal comprises: at least one DL PRS, at least one synchronization signal block (SSB), at least one system information block (SIB), at least one other reference signal comprising a channel state information reference signal (CSI-RS), or a combination thereof; processing the at least one DL PRS, or the at least one PRS and at least one of the: at least one SSB, at least one SIB, or a master information block (MIB); performing at least one measurement for at least one of a pathloss or a propagation delay to at least one serving base station of the one of more base stations, based, at least in part, on the processing; and performing at least one adjustment for random access based, at least in part, on the at least one measurement.

Certain aspects of the present disclosure provide an apparatus for wireless communication. The apparatus may be a UE and may generally include at least one processor, memory coupled (electronically, operatively, communicatively, or otherwise) to the at least one processor, the memory comprising instructions executable (e.g., directly, or after compiling, converting, interpreting, etc.) by the at least one processor to cause the apparatus to: receive at least one downlink (DL) signal from one or more base stations, wherein the received at least one DL signal comprises: at least one DL PRS, at least one synchronization signal block (SSB), at least one system information block (SIB), at least one other reference signal comprising a channel state information reference signal (CSI-RS), or a combination thereof; process the at least one DL PRS, or the at least one PRS and at least one of the: at least one SSB, at least one SIB, or a master information block (MIB); perform at least one measurement for at least one of a pathloss or a propagation delay to at least one serving base station of the one of more base stations, based, at least in part, on the processing; and perform at least one adjustment for random access based, at least in part, on the at least one measurement.

Certain aspects of the present disclosure provide for an apparatus for wireless communication. The apparatus may be a UE and may generally include: means for receiving at least one downlink (DL) signal from one or more base stations, wherein the received at least one DL signal comprises: at least one DL PRS, at least one synchronization signal block (SSB), at least one system information block (SIB), at least one other reference signal comprising a channel state information reference signal (CSI-RS), or a combination thereof; processing the at least one DL PRS, or the at least one PRS and at least one of the: at least one SSB, at least one SIB, or a master information block (MIB); performing at least one measurement for at least one of a pathloss or a propagation delay to at least one serving base station of the one of more base stations, based, at least in part, on the processing; and performing at least one adjustment for random access based, at least in part, on the at least one measurement.

Certain aspects of the present disclosure provide for a computer-readable medium for wireless communication by a wireless device, such as a UE. The computer-readable medium generally includes code, which when executed (e.g., directly, or after compiling, converting, interpreting, etc.) by at least one processor, causes the UE to: receive at least one downlink (DL) signal from one or more base stations, wherein the received at least one DL signal comprises: at least one DL PRS, at least one synchronization signal block (SSB), at least one system information block (SIB), at least one other reference signal comprising a channel state information reference signal (CSI-RS), or a combination thereof; process the at least one DL PRS, or the at least one PRS and at least one of the: at least one SSB, at least one SIB, or a master information block (MIB); perform at least one measurement for at least one of a pathloss or a propagation delay to at least one serving base station of the one of more base stations, based, at least in part, on the processing; and perform at least one adjustment for random access based, at least in part, on the at least one measurement.

In an aspect of the disclosure, methods, computer-readable media, and apparatuses are provided. The apparatuses may be user equipment (UE) or a base station. Certain aspects of the present disclosure provide a method for wireless communication, performed by a wireless device, such as a user equipment (UE). The method generally includes: receiving at least one downlink (DL) signal from one or more base stations, wherein the received at least one DL signal comprises: at least one DL positioning reference signal (PRS), at least one synchronization signal block (SSB), at least one system information block (SIB), at least one other reference signal comprising a channel state information reference signal (CSI-RS), or a combination thereof, the one or more base stations comprising at least one serving base station, or at least one serving base station and at least one neighbor base station, the at least one DL PRS comprising a cell identification (ID) associated with a base station, of the one or more base stations, from which the at least one DL PRS is received, wherein receiving the at least one DL PRS comprises detecting and processing the at least one DL PRS when the UE is in an idle state, an inactive state, or a connected state, wherein the at least one DL PRS has a corresponding cell-specific configuration, and wherein an association between each cell ID and its corresponding cell-specific configuration is determined by a network comprising at least one of the one or more base stations; performing at least one measurement based, at least in part, on the received at least one DL signal; and performing at least one adjustment for random access based, at least in part, on the at least one measurement.

Certain aspects of the present disclosure provide an apparatus for wireless communication. The apparatus may be a UE and may generally include at least one processor, memory coupled (electronically, operatively, communicatively, or otherwise) to the at least one processor, the memory comprising instructions executable (e.g., directly, or after compiling, converting, interpreting, etc.) by the at least one processor to cause the apparatus to: receive at least one downlink (DL) signal from one or more base stations, wherein the received at least one DL signal comprises: at least one DL positioning reference signal (PRS), at least one synchronization signal block (SSB), at least one system information block (SIB), at least one other reference signal comprising a channel state information reference signal (CSI-RS), or a combination thereof, the one or more base stations comprising at least one serving base station, or at least one serving base station and at least one neighbor base station, the at least one DL PRS comprising a cell identification (ID) associated with a base station, of the one or more base stations, from which the at least one DL PRS is received, wherein receiving the at least one DL PRS comprises detecting and processing the at least one DL PRS when the UE is in an idle state, an inactive state, or a connected state, wherein the at least one DL PRS has a corresponding cell-specific configuration, and wherein an association between each cell ID and its corresponding cell-specific configuration is determined by a network comprising at least one of the one or more base stations; perform at least one measurement based, at least in part, on the received at least one DL signal; and perform at least one adjustment for random access based, at least in part, on the at least one measurement.

Certain aspects of the present disclosure provide for an apparatus for wireless communication. The apparatus may be a UE and may generally include: means for receiving at least one downlink (DL) signal from one or more base stations, wherein the received at least one DL signal comprises: at least one DL positioning reference signal (PRS), at least one synchronization signal block (SSB), at least one system information block (SIB), at least one other reference signal comprising a channel state information reference signal (CSI-RS), or a combination thereof, the one or more base stations comprising at least one serving base station, or at least one serving base station and at least one neighbor base station, the at least one DL PRS comprising a cell identification (ID) associated with a base station, of the one or more base stations, from which the at least one DL PRS is received, wherein receiving the at least one DL PRS comprises detecting and processing the at least one DL PRS when the UE is in an idle state, an inactive state, or a connected state, wherein the at least one DL PRS has a corresponding cell-specific configuration, and wherein an association between each cell ID and its corresponding cell-specific configuration is determined by a network comprising at least one of the one or more base stations; means for performing at least one measurement based, at least in part, on the received at least one DL signal; and means for performing at least one adjustment for random access based, at least in part, on the at least one measurement.

Certain aspects of the present disclosure provide for a computer-readable medium for wireless communication by a wireless device, such as a UE. The computer-readable medium generally includes code, which when executed (e.g., directly, or after compiling, converting, interpreting, etc.) by at least one processor, causes the UE to: receive at least one downlink (DL) signal from one or more base stations, wherein the received at least one DL signal comprises: at least one DL positioning reference signal (PRS), at least one synchronization signal block (SSB), at least one system information block (SIB), at least one other reference signal comprising a channel state information reference signal (CSI-RS), or a combination thereof, the one or more base stations comprising at least one serving base station, or at least one serving base station and at least one neighbor base station, the at least one DL PRS comprising a cell identification (ID) associated with a base station, of the one or more base stations, from which the at least one DL PRS is received, wherein receiving the at least one DL PRS comprises detecting and processing the at least one DL PRS when the UE is in an idle state, an inactive state, or a connected state, wherein the at least one DL PRS has a corresponding cell-specific configuration, and wherein an association between each cell ID and its corresponding cell-specific configuration is determined by a network comprising at least one of the one or more base stations; perform at least one measurement based, at least in part, on the received at least one DL signal; and perform at least one adjustment for random access based, at least in part, on the at least one measurement.

Certain aspects of the present disclosure provide a method for wireless communication, performed by a wireless device, such as a base station (BS). The method generally includes: transmitting at least one downlink (DL) signal to a user equipment (UE) or receiving at least one uplink (UL) positioning reference signal (PRS) from the UE, the transmitted at least one DL signal comprising: at least one positioning reference signal (PRS), at least one synchronization signal block (SSB), at least one system information block (SIB), at least one other reference signal comprising a channel state information reference signal (CSI-RS), or a combination thereof, wherein at least one measurement is performed based, at least in part, on the at least one DL signal or the at least one UL PRS, and wherein the UE performs at least one adjustment for random access with the BS based, at least in part, on the at least one measurement.

Certain aspects of the present disclosure provide an apparatus for wireless communication. The apparatus may be a BS and may generally include at least one processor, memory coupled (electronically, operatively, communicatively, or otherwise) to the at least one processor, the memory comprising instructions executable (e.g., directly, or after compiling, converting, interpreting, etc.) by the at least one processor to cause the apparatus to: transmit at least one downlink (DL) signal to a user equipment (UE) or receiving at least one uplink (UL) positioning reference signal (PRS) from the UE, the transmitted at least one DL signal comprising: at least one positioning reference signal (PRS), at least one synchronization signal block (SSB), at least one system information block (SIB), at least one other reference signal comprising a channel state information reference signal (CSI-RS), or a combination thereof, wherein at least one measurement is performed based, at least in part, on the at least one DL signal or the at least one UL PRS, and wherein the UE performs at least one adjustment for random access with the BS based, at least in part, on the at least one measurement.

Certain aspects of the present disclosure provide for an apparatus for wireless communication. The apparatus may be a BS and may generally include: means for transmitting at least one downlink (DL) signal to a user equipment (UE) or receiving at least one uplink (UL) positioning reference signal (PRS) from the UE, the transmitted at least one DL signal comprising: at least one positioning reference signal (PRS), at least one synchronization signal block (SSB), at least one system information block (SIB), at least one other reference signal comprising a channel state information reference signal (CSI-RS), or a combination thereof, wherein at least one measurement is performed based, at least in part, on the at least one DL signal or the at least one UL PRS, and wherein the UE performs at least one adjustment for random access with the BS based, at least in part, on the at least one measurement.

Certain aspects of the present disclosure provide for a computer-readable medium for wireless communication by a wireless device, such as a BS. The computer-readable medium generally includes code, which when executed (e.g., directly, or after compiling, converting, interpreting, etc.) by at least one processor, causes the BS to: transmit at least one downlink (DL) signal to a user equipment (UE) or receiving at least one uplink (UL) positioning reference signal (PRS) from the UE, the transmitted at least one DL signal comprising: at least one positioning reference signal (PRS), at least one synchronization signal block (SSB), at least one system information block (SIB), at least one other reference signal comprising a channel state information reference signal (CSI-RS), or a combination thereof, wherein at least one measurement is performed based, at least in part, on the at least one DL signal or the at least one UL PRS, and wherein the UE performs at least one adjustment for random access with the BS based, at least in part, on the at least one measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with certain aspects of the present disclosure.

FIG. 18 illustrates example operations for a base station (BS), in accordance with certain aspects of the present disclosure.

DETAILED DESCRIPTION

Figure 1:
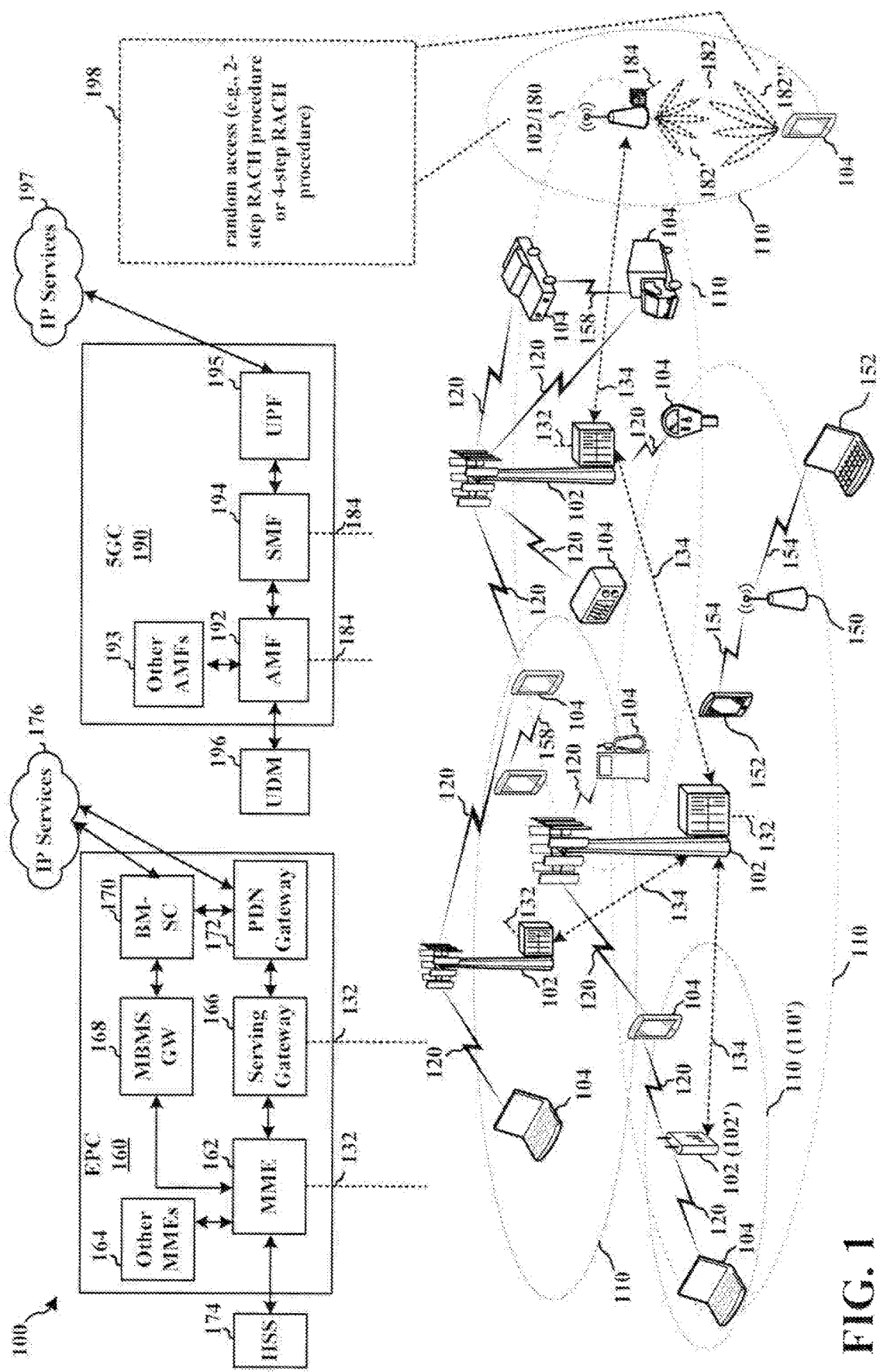
FIG. 1 is a diagram illustrating an example of a wireless communications system and an access network, in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using hardware, software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells. The term "cell" can refer to, for example, a coverage area of a BS and/or a BS subsystem serving this coverage area, depending on the context in which the term is used.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a netbook, a smartbook, a personal digital assistant (PDA), a robots/robotic device, a drone, industrial manufacturing equipment, a satellite radio, a navigation/positioning device (e.g., GNSS (global navigation satellite system) devices based on, for example, GPS (global positioning system), Beidou, GLONASS, or Galileo, a terrestrial-based device, etc.), a multimedia device, an entertainment device, a video device, a digital audio player (e.g., MP3 player), a camera, a gaming device, a tablet, a smart device, a wearable device (e.g., a smart watch, smart clothing, smart glasses, virtual reality goggles, a smart wristband, smart jewelry (e.g., a smart ring, a smart bracelet)), a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. Machine type communication (MTC) may refer to communication involving at least one remote device on at least one end of the communication and may include forms of data communication which involve one or more entities that do not necessarily need human interaction. MTC UEs may include UEs that are capable of MTC communications with, e.g., MTC servers and/or other MTC devices through Public Land Mobile Networks (PLMN), for example. Wireless devices may include Internet-of-Things (IoT) devices (e.g., narrowband IoT (NB-IoT) devices). IoT may refer to a network of physical objects, devices, or "things". IoT devices may be embedded with, for example, electronics, processing units, software, or sensors and may have network connectivity, which enable these devices to collect and exchange data. Some of the UEs 104 may be referred to as IoT devices (e.g., meters, gas pumps, toasters, robots, drones, vehicles, heart monitors, etc.). IoT UEs may include MTC/enhanced MTC (eMTC) UEs, NB-IoT UEs, as well as other types of UEs. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive at least one downlink signal from one or more base stations, perform at least one measurement based, at least in part, on the at least one downlink signal, and perform at least one adjustment for random access (e.g., random access channel (RACH) procedure 198) based, at least in part, on the at least one measurement. The UE may generate a preamble associated with the RACH procedure 198. The random access may be, for example, a 2-step RACH procedure or a 4-step RACH procedure. In accordance with certain aspects of the present disclosure, for the 2-step procedure, the UE 104 may generate a payload, including, for example, at least one demodulation reference signal (DMRS) and information in a physical uplink shared channel (PUSCH). The UE 104 may send, in a first message to initiate the RACH procedure 198 with a base station 102/180, the preamble on a first set of resources and the payload on a second set of resources. UE 104 may receive a second message associated with completion of the RACH procedure 198. The second message may be transmitted by base station 102/180 in response to the first message. In accordance with certain aspects of the present disclosure, for the 4-step procedure, UE 104 may transmit a first message (msg1) to base station 102/180 to initiate the RACH procedure 198, the first message comprising a preamble. UE 104 may receive a second message (msg2) associated with a random access response. The second message may be transmitted by base station 102/180 in response to the first message. the second message may comprise a reduced payload size for timing advance. UE 104 may transmit a third message in response to the second message. The third message (msg3) may comprise information transmitted on an uplink shared channel. UE 104 may receive a fourth message (msg4) associated with completion of the RACH procedure 198. The fourth message may be transmitted by base station 102/180 in response to the third message.

Base station 102/180 may be configured to send at least one system information block (SIB), wherein the at least one SIB includes configuration information associated with the RACH procedure 198. The base station 102/180 may receive, from the UE 104, the first message associated with initiation of the RACH procedure 198, and the preamble of the first message is received on a first set of resources and a payload of the first message is received on a second set of resources. The base station 102/180 may send, to the UE 104 based on the first message, a second message associated with completion of the RACH procedure 198, wherein the second message includes, for example, control information in a physical downlink control channel (PDCCH) and data in a physical downlink shared channel (PDSCH).

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD (frequency division duplex) in which for a particular set of subcarriers (carrier system bandwidth), subframes within the set of subcarriers are dedicated for either DL or UL, or may be TDD (time division duplex) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kilohertz (kHz) and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as Rx for one particular configuration, where 100× is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
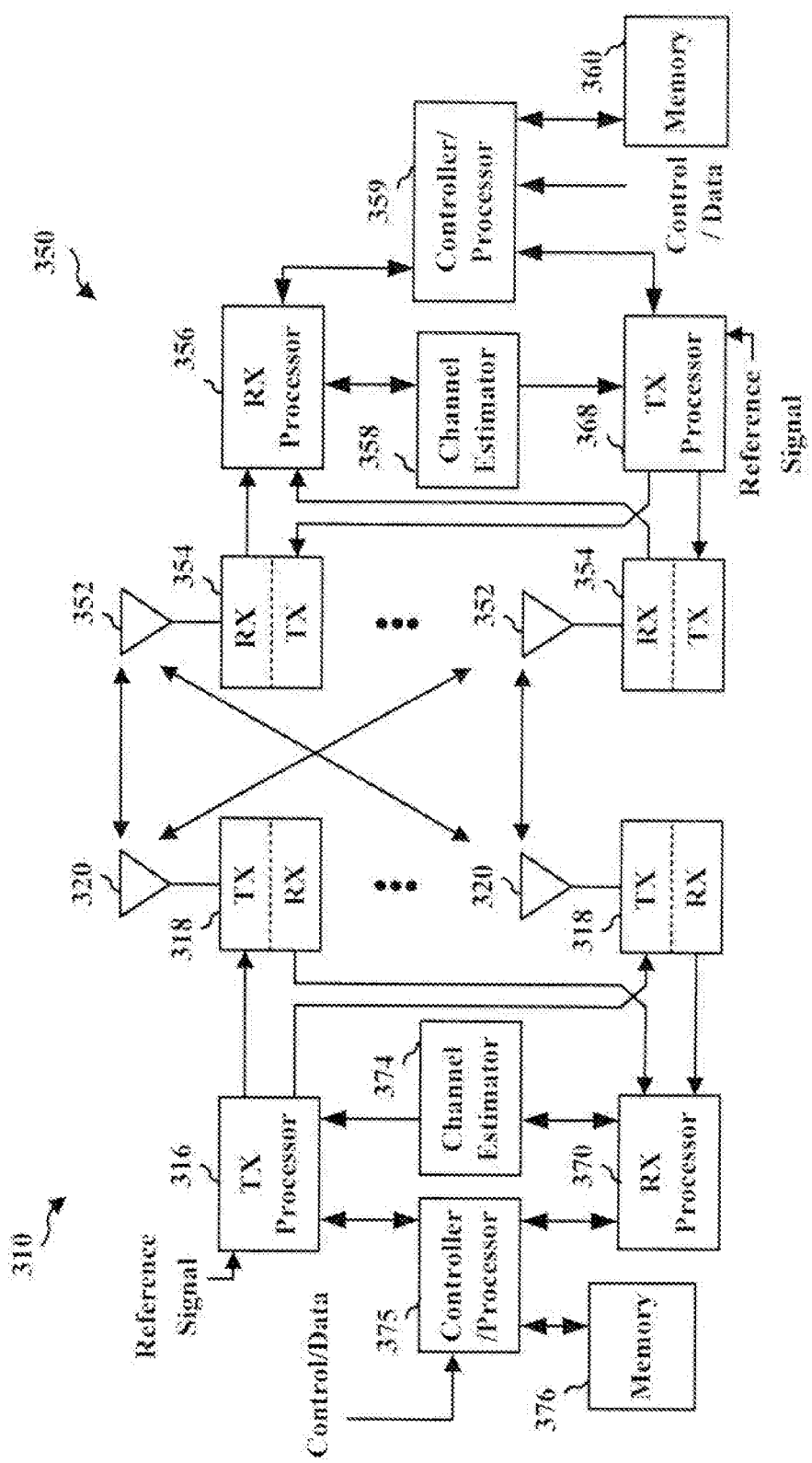
FIG. 3 is a diagram illustrating an example of a base station and user equipment (UE) in an access network, in accordance with certain aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
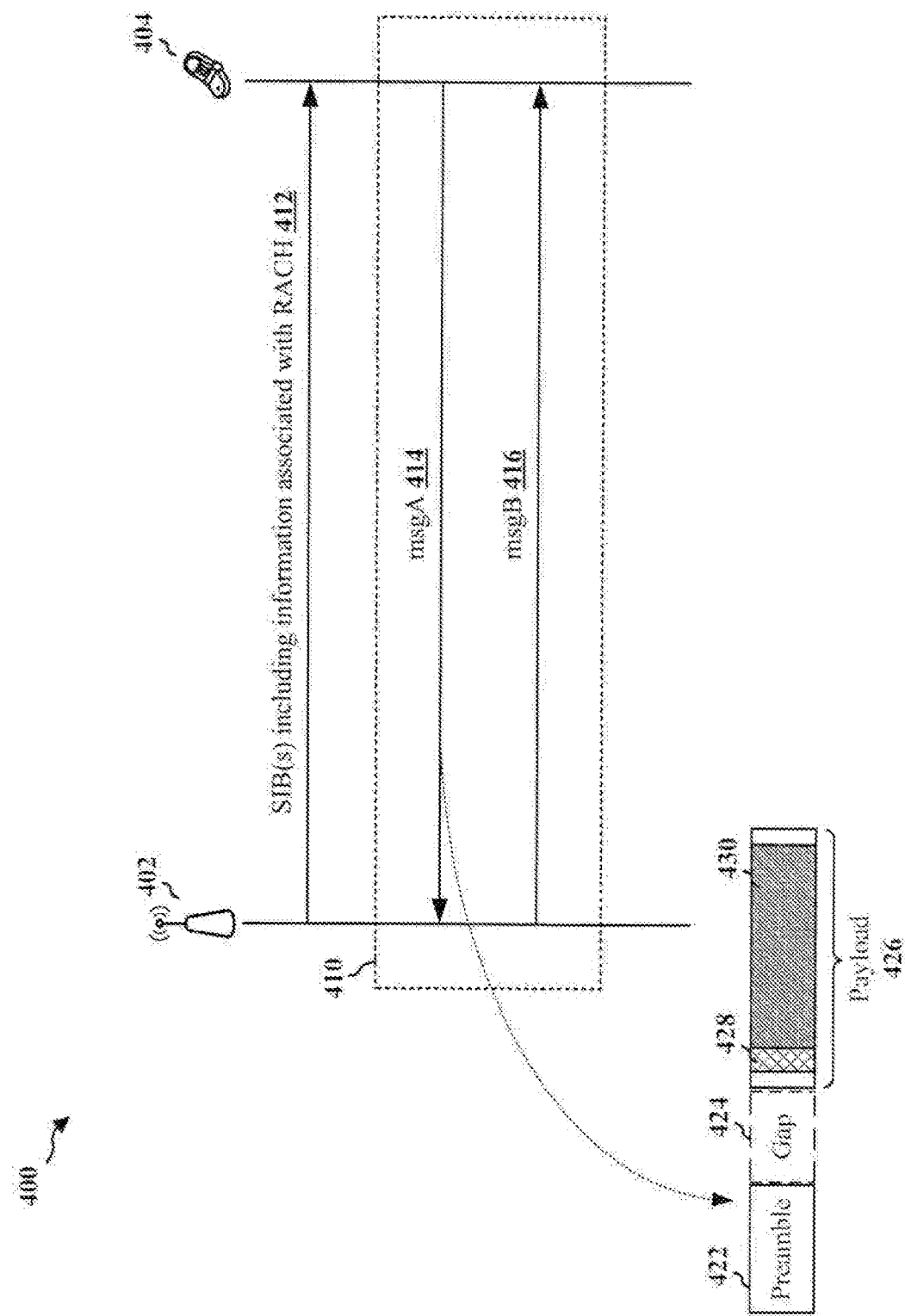
FIG. 4 is a call flow diagram of wireless communications system, in accordance with certain aspects of the present disclosure.

FIG. 4 is a call flow diagram illustrating a RACH procedure 410 in a wireless communications system 400. The wireless communications system 400 may include a base station 402 and a UE 404. The base station 402 may provide a cell, on which the UE 404 may operate. Aspects of the base station 402 may be described with respect to the base station 102 of FIG. 1, the gNB 180 of FIG. 1, and/or the base station 310 of FIG. 3. Aspects of the UE 404 may be described with respect to the UE 104 of FIG. 1 and/or the UE 350 of FIG. 3.

In order to communicate in the wireless communications system 400, the base station 402 and the UE 404 may acquire a timing advance for uplink signals. The base station 402 and the UE 404 may acquire timing synchronization (e.g., uplink timing synchronization) through RACH procedure 410. For example, the UE 404 may initiate the RACH procedure 410 for initial access to the cell provided by the base station 402, RRC connection reestablishment, handover from another base station to the base station 402, reacquisition of timing synchronization, transition from an RRC Inactive state, SCell timing alignment, request for Other System Information (SI), and/or beam failure recovery.

In the wireless communications system 400, the RACH procedure 410 may include the exchange of two messages, which may be referred to as "2-step RACH." Specifically, the UE 404 may initiate the message exchange of the RACH procedure 410 by sending a first RACH message 414 to the base station 402 and, responsive to the first RACH message 414, the base station may complete the message exchange of the RACH procedure 410 by sending a second RACH response message 416 to the UE 404. In some aspects, the first RACH message 414 may be referred to as "msgA" and the second RACH response message 416 may be referred to as "msgB."

The RACH procedure 410 may be applicable to any size of the cell provided by the base station 402, all RRC states in which the UE 404 may operate, and/or whether or not the UE 404 has a valid timing advance (TA) (e.g., for adjustment of the timing of uplink transmission by the UE 404). The RACH procedure 410 may differ in some aspects from other RACH procedures, such as RACH procedures in which four messages are exchanged (e.g., "4-step RACH"). However, some aspects may be common across the RACH procedure 410 and another RACH procedure (e.g., a 4-step RACH procedure). For example, sequences associated with physical RACH (PRACH) and sequences associated with DMRS used for a 4-step RACH procedure may also be used for the RACH procedure 410. Further, a TX chain used for a PUSCH in a 4-step RACH procedure may also be used for the RACH procedure 410.

The base station 402 may periodically send (e.g., broadcast) information associated with operating on the cell provided by the base station 402. As described with respect to FIG. 2B, supra, the base station 402 may send a MIB and one or more SIBs. At least one SIB 412 may include configuration information associated with the RACH procedure 410. In one aspect, the at least one SIB 412 may indicate information associated with resource allocation(s) for the msgA 414, sequence configurations associated with a preamble 422 of the msgA 414, modulation and coding schemes (MCSs) associated with the msgA 414, transmission powers associated with the msgA 414, and/or other configuration information. The UE 404 may receive and decode the at least one SIB 412 and may subsequently perform the RACH procedure 410 based on the configuration information indicated by the at least one SIB 412.

To initiate the RACH procedure 410, the UE 404 may generate the msgA 414 (first message of 2-step RACH). For the RACH procedure 410, the UE 404 may generate the msgA 414 to include at least a PRACH preamble 422 and a payload 426. The payload 426 may include at least one DMRS 428 and data in a PUSCH 430. In some aspects, the msgA 414 may additionally include a gap 424 in time between the preamble 422 and the payload 426.

With reference to the PRACH preamble 422, the UE 404 may generate the preamble 422 based on at least one sequence, which may be described with respect to the length as a long sequence or a short sequence. The UE 404 may determine to use a long sequence or a short sequence based on one or more characteristics of the RACH procedure 410 with the base station 402, such as a bandwidth for the preamble 422, the numerology of the preamble 422, the size of the cell provided by the base station 402 (e.g., small cell or larger cell), an RRC state of the UE 404, and/or other characteristic(s). Illustratively, Table 1 shows PRACH preamble characteristics for a long sequence having a numerology that is different from that of the PUSCH in the payload, and occupying bandwidth of 1.08/4.32 MHz. Table 2 shows PRACH preamble characteristics for a short sequence having a numerology that is the same as that of the PUSCH in the payload, and occupying a bandwidth of twelve PRBs, e.g., for a frequency range (FR) 1 with 15 kHz/30 kHz subcarrier spacing (SCS) and occupying a bandwidth of 2.16/4.32 MHz.

TABLE 1

| Format | Numerology (kHz) | Number of Repetitions | CP length (μs) | Preamble length (not including CP) (μs) |
|---|---|---|---|---|
| 0 | 1.25 | 1 | ≈100 | 800 |
| 1 | 1.25 | 2 | ≈680 | 1600 |
| 2 | 1.25 | 4 | ≈15 | 3200 |
| 3 | 5 | 1 | ≈100 | 800 |

TABLE 2

| Format | Number of Repetitions | CP length (μs) | Preamble length (not including CP) (μs) |
|---|---|---|---|
| A1 | 2 | 9.4 | 133 |
| A2 | 4 | 18.7 | 267 |
| A3 | 6 | 28.1 | 400 |
| B1 | 2 | 7.0 | 133 |
| B2 | 4 | 11.7 | 267 |
| B3 | 6 | 126.4 | 400 |
| B4 | 12 | 30.5 | 800 |
| C0 | 1 | 40.4 | 66.7 |
| C2 | 4 | 66.7 | 267 |

Referring to the payload 426, the UE 404 may generate the payload 426 to include at least one DMRS 428 and data in a PUSCH 430. The at least one DMRS 428 may be associated with the PUSCH 430—e.g., the at least one DMRS 428 may be used by a receiver (e.g., the base station 402) for channel estimation when receiving the PUSCH 430.

For the payload 426, the UE 404 may determine a TB size and an MCS. In one aspect, the UE 404 may perform one or more downlink measurements (e.g., to measure channel quality, such as reference signal received power (RSRP)) and may determine a state of a buffer of the UE 404 (e.g., buffer occupancy status) and the QoS of buffered data. Based on the one or more downlink measurements and/or based on the buffer state, the UE 404 may determine the TB size and/or the MCS to be applied to the payload 426. For example, the UE 404 may adjust the TB size and/or the MCS according to the current channel conditions (indicated by the downlink measurement(s)) and/or according to the amount of uplink data the UE 404 is to send to the base station 402 in the PUSCH 430.

In another aspect, the UE 404 may determine the TB size and/or the MCS to be applied to the payload 426 based on the RRC state of the UE 404 and/or the size of the cell provided by the base station 402 on which the UE 404 operates. For example, the UE 404 may access a table (e.g., a lookup table) that indicates correspondence between each of a set of RRC states and/or cell sizes and a respective MCS and/or TB size to be applied for transmission of the payload 426. In various aspects, the table may be predefined in the UE 404 (e.g., stored according to a 3GPP standard) or may be signaled to the UE 404 from the base station 402 (e.g., in at least one SIB). Accordingly, the UE 404 may determine the current RRC state of the UE 404 and/or cell size provided by the base station 402, and then the UE 404 may refer to the table to determine the MCS and/or TB size that corresponds to the current RRC state and/or cell size. The UE 404 may then apply the determined MCS and/or TB size to the payload 426. With this variability, the UE 404 and base station 402 may benefit from a mechanism for indicating MCS, TB size, and/or payload size to the base station 402 by the UE 404.

With the preamble 422 sent separately from the payload 426, the preamble 422 may be used to indicate information about the payload 426 (e.g., the at least one DMRS 428 may provide channel estimation for the PUSCH 430, thus the preamble 422 may be used to convey information other than channel estimation). For example, the UE 404 may generate the preamble 422 and/or assign the preamble 422 to a first set of resources in order to indicate the size of the payload 426, the MCS applied to the payload 426, and/or the TB size used for the payload 426.

In one aspect, the UE 404 may generate the preamble 422 according to a sequence configuration that indicates the size of the payload 426, the TB size in the payload 426, and/or the MCS applied to the payload 426. The UE 404 may determine the size of the payload 426, TB size in the payload 426, and/or MCS, and the UE 404 may determine a sequence configuration that corresponds to the size of the payload 426, TB size, and/or the MCS. For example, the UE 404 may access a table (e.g., a lookup table) that indicates correspondence between a respective sequence configuration and a respective size of the payload 426, TB size, and/or MCS. The UE 404 may receive information (e.g., table) indicating a respective size of the payload 426, TB size, and/or MCS and a corresponding sequence configuration from the base station 402, such as in a SIB (e.g., the SIB 412).

In one aspect, the UE 404 may generate the preamble 422 to indicate the size of the payload 426, the TB size in the payload 426, and/or the MCS applied to the payload 426 based on one or more parameters used to generate the preamble 422. The one or more parameters may include a cyclic shift applied to a sequence, a root sequence index used for generation of a sequence, another parameter, and/or a combination of parameters (e.g., a combination of a cyclic shift and a root index). Thus, at least a portion of each possible sequence that the UE 404 may generate for the preamble 422 may correspond to at least one of the size of the payload 426, the TB size in the payload 426, and/or the MCS applied to the payload 426. Accordingly, the UE 404 may generate a sequence that corresponds to the at least one of the size of the payload 426, the TB size in the payload 426, and/or the MCS applied to the payload 426. By using a corresponding sequence in the preamble 422, the UE 404 may indicate at least one of the size of the payload 426, the TB size, and/or the MCS to the base station 402.

In one aspect, the UE 404 may additionally determine a sequence configuration based on an RRC state of the UE 404 and/or a size of the cell on which the UE 404 is operating. For example, the UE 404 may use a short sequence (e.g., length 139) and/or a relatively larger SCS (e.g., 15/30 kHz) when the UE 404 is operating on a small cell and/or when the UE 404 is operating in an RRC Connected state. In another example, the UE 404 may use a long sequence (e.g., length 839) and/or a relatively smaller SCS (e.g., 1.25/5/7.5 kHz) when the UE 404 is operating on a larger cell (e.g., macro cell) and/or when the UE 404 is operating in an RRC Inactive or RRC Idle state.

With multiple UEs using sequences in preambles to indicate sizes of payloads, TB sizes in payloads, and/or MCSs applied to payloads, the probability of collisions may increase—that is, the base station 402 may be more likely to receive two identical preambles from two different UEs. In order to reduce the probability of preamble collision, "composite" preambles may be used to increase the pool of available preambles for msgA from different UEs. A composite preamble may include at least two sequences, which may be concatenated in time/frequency (e.g., by OCC).

For example, the UE 404 may generate the preamble 422 by generating a first sequence and generating at least one second sequence. The UE 404 may concatenate the first sequence and the at least one second sequence to form the preamble 422. The UE 404 may then send the preamble 422 (including the first sequence concatenated with the at least one second sequence) to the base station 402 by multiplexing the first sequence and the at least one second sequence. The UE 404 may time-division multiplex, frequency-division multiplex, and/or space-division multiplex the first sequence and the at least one second sequence to differentiate the sequences when received by the base station 402.

In some aspects, the UE 404 may indicate at least one of the size of the payload 426, the TB size in the payload 426, and/or the MCS applied to the payload 426 using a composite sequence. For example, the combination of the first sequence and the at least one second sequence may indicate at least one of the size of the payload 426, TB size, and/or MCS. In another example, each of the individual first sequence and at least one second sequence may indicate one or more of the size of the payload 426, TB size, and/or MCS.

The UE 404 may assign the preamble 422 to a first set of resources for transmission to the base station 402. In one aspect, the UE 404 may determine the first set of resources based on at least one of the size of the payload 426, the TB size in the payload 426, and/or the MCS applied to the payload 426. Accordingly, the first set of resources to which the preamble 422 is assigned may indicate the at least one of the size of the payload 426, the TB size in the payload 426, and/or the MCS applied to the payload 426 when the base station 402 receives the preamble 422.

In one aspect, the UE 404 may determine the first set of resources based on information that indicates correspondence between sets of resources and the at least one of the size of the payload 426, the TB size in the payload 426, and/or the MCS applied to the payload 426. For example, the UE 404 may access a table (e.g., a lookup table) that indicates the correspondence between sets of resources and the at least one of the size of the payload 426, TB size, and/or MCS. In various aspects, the information (e.g., table) may be predefined in the UE 404 (e.g., stored according to a 3GPP standard) or may be signaled to the UE 404 from the base station 402 (e.g., in at least one SIB).

With the preamble 422 separate from the payload 426, the UE 404 may assign the payload 426 to a second set of resources. The second set of resources may be based on a size of the cell on which the UE 404 is operating and/or the RRC state in which the UE 404 is operating. Accordingly, the UE 404 may determine at least one of the cell size of the base station 402 and/or the RRC state of the UE 404, and the UE 404 may determine a second set of resources that corresponds to the at least one of the cell size of the base station 402 and/or the RRC state of the UE 404.

In one aspect, the UE 404 may determine the second set of resources based on information that indicates correspondence between sets of resources and the at least one of the size of the cell on which the UE 404 is operating and/or the RRC state in which the UE 404 is operating. For example, the UE 404 may access a table (e.g., a lookup table) that indicates the correspondence between sets of resources and the at least one of the size of the cell on which the UE 404 is operating and/or the RRC state in which the UE 404 is operating. In another example, the second set of resources may be a function (e.g., mathematical function) of the at least one of the size of the cell on which the UE 404 is operating and/or the RRC state in which the UE 404 is operating. The UE 404 may evaluate the function with the cell size and RRC state as inputs in order to obtain the second set of resources. In various aspects, the information (e.g., table, function, etc.) may be predefined in the UE 404 (e.g., stored according to a 3GPP standard) or may be signaled to the UE 404 from the base station 402 (e.g., in at least one SIB).

The UE 404 may be identified by the base station 402 according to an identifier (ID) of the UE 404, such as a radio network temporary identifier (RNTI) (e.g., a random access (RA) RNTI, a temporary RNTI, etc.). The msgA 414 may be the first transmission by the UE 404 to the base station 402 and, therefore, the base station 402 may benefit from a mechanism for indicating the ID of the UE 404 to the base station 402 in the msgA 414, particularly because the msgA 414 may include data from the UE 404 in the payload 426. Accordingly, the UE 404 may indicate an ID of the UE 404 using one or more (or a combination of) approaches for including information in the msgA 414.

In one aspect, the UE 404 may indicate an ID of the UE 404 based on the sequence of the preamble 422. For example, a sequence index used by the UE 404 for generating the sequence of the preamble 422 may indicate the ID of the UE 404. In one aspect, different root sequence indexes may correspond to different IDs or different bits of an ID. The UE 404 may determine an ID of the UE 404, and the UE 404 may determine a root sequence index for generating the preamble 422 based on the ID of the UE 404. The UE 404 may access information that indicates correspondence between ID information (e.g., sets of bits) and the different root sequence indexes. For example, the UE 404 may access a table (e.g., a lookup table) that indicates the correspondence between ID information (e.g., sets of bits) and the different root sequence indexes. The UE 404 may generate a sequence for the preamble 422 from a root sequence index that corresponds to the ID information to be conveyed by the UE 404 to the base station 402.

In another aspect, the UE 404 may indicate an ID of the UE 404 based on a composite sequence of the preamble 422. For example, a combination of sequences and/or a combination of sequence parameters (e.g., cyclic shifts, root sequence indexes, etc.) used by the UE 404 for the composite sequence of the preamble 422 may indicate ID information (e.g., a set of bits) of the UE 404. The UE 404 may access information that indicates correspondence between ID information (e.g., sets of bits) and composite sequences. Accordingly, the UE 404 may generate a composite sequence for the preamble 422 that corresponds to ID information to be conveyed by the UE 404 to the base station 402.

In one aspect, the UE 404 may indicate an ID of the UE 404 based on the sequence of the at least one DMRS 428. For example, a DMRS sequence index used by the UE 404 for generating the at least one DMRS 428 may indicate the ID of the UE 404. In one aspect, different DMRS sequence indexes may correspond to different IDs or different bits of an ID. The UE 404 may determine an ID of the UE 404, and the UE 404 may determine a DMRS sequence index for generating the at least one DMRS 428 based on the ID of the UE 404. The UE 404 may access information that indicates correspondence between ID information (e.g., sets of bits) and the different DMRS sequence indexes. For example, the UE 404 may access a table (e.g., a lookup table) that indicates the correspondence between ID information (e.g., sets of bits) and the different DMRS sequence indexes. The UE 404 may generate a sequence for the at least one DMRS 428 from a DMRS sequence index that corresponds to the ID information to be conveyed by the UE 404 to the base station 402.

In another aspect, the UE 404 may indicate an ID of the UE 404 using a portion of the bits in the payload 426. For example, a portion of the bits of the payload 426 may be reserved for indicating ID information associated with the UE 404. Accordingly, the UE 404 may set the portion of the bits in the payload 426 to values indicating at least a portion of the ID information associated with the UE 404.

In another aspect, the UE 404 may indicate an ID of the UE 404 using a scrambling code that is used to scramble the payload 426. For example, a scrambling code used by the UE 404 for scrambling the payload 426 may indicate the ID of the UE 404. In one aspect, different scrambling codes may correspond to different IDs or different bits of an ID. The UE 404 may determine an ID of the UE 404, and the UE 404 may determine a scrambling code for scrambling the payload 426 based on the ID of the UE 404. The UE 404 may then use the determined scrambling code for scrambling the payload 426 in order to indicate ID information (e.g., a set of bits of the ID of the UE 404) associated with the UE 404 to the base station 402.

In another aspect, the UE 404 may indicate an ID of the UE 404 using a cyclic redundancy check (CRC) mask. For example, a mask used by the UE 404 for masking the CRC included in the msgA 414 may indicate the ID of the UE 404. In one aspect, different CRC masks may correspond to different IDs or different bits of an ID. The UE 404 may determine an ID of the UE 404, and the UE 404 may determine a mask used by the UE 404 for masking the CRC included in the msgA 414 based on the ID of the UE 404. The UE 404 may then mask the CRC included in the msgA 414 using the determined CRC mask in order to indicate ID information (e.g., a set of bits of the ID of the UE 404) associated with the UE 404 to the base station 402.

In one aspect, the UE 404 may use a combination of two or more of the aforementioned techniques for conveying ID information in order to indicate an ID of the UE 404 to the base station 402. For example, a root sequence index used for generation of the sequence for the preamble 422 may indicate a first set of bits and a second set of bits may be indicated in the payload 426. The base station 402 may combine the first set of bits and the second set of bits in order to obtain the full ID of the UE 404.

With the generated preamble 422 and the generated payload 426, the UE 404 may send the msgA 414 to the base station 402. The UE 404 may send the msgA 414 by first sending the preamble 422 and then sending the payload 426. When the UE 404 sends the payload 426, the DMRS 428 and the PUSCH 430 may be in the same slot and may have the same bandwidth.

The UE 404 may send the payload 426 of the msgA 414 with or without frequency hopping in the PUSCH 430. With or without hopping in the PUSCH 430, the UE 404 may frontload a first of the at least one DMRS 428. Specifically, the UE 404 may assign the first of the at least one DMRS 428 to one of two possible locations: the first OFDM symbol or the third/fourth symbol of the slot in which the first of the at least one DMRS 428 and the PUSCH 430 are sent.

The UE 404 may assign the at least one DMRS 428 to one or more symbols that are the same for the PUSCH 430 with CP-OFDM and DFT-s-OFDM without frequency hopping. In one aspect, the UE 404 may frontload the at least one DMRS 428 according to a DMRS configuration type 1, which may support up to eight ports. With DMRS configuration type 1, the at least one DMRS 428 may be assigned to resource(s) with an interleaved frequency division multiplexing (IFDM)-based pattern having a Comb-2 pattern with CSs, assigned to one OFDM symbol having a Comb-2 pattern with two CSs for up to four ports, and/or assigned to two OFDM symbols having a Comb-2 pattern with two CSs and time domain (TD) orthogonal cover code (OCC) (TD-OCC) ({1 1} and {1 −1}) for up to eight ports. When the number of ports for the at least one DMRS 428 is less than or equal to four, the number of frontloaded DMRS symbols may be one or two. For the at least one DMRS 428 for CP-OFDM with extended CP (e.g., at least 60 kHz SCS), the DMRS configuration type 1 as with normal CP may be supported. In some cases, the OCC can be applied in both time and frequency domain to enlarge the pool size of DMRS.

In another aspect, the UE 404 may frontload the at least one DMRS 428 according to configuration type 2, which may support up to twelve ports. With DMRS configuration type 2, the at least one DMRS 428 may be assigned according to a frequency domain (FD) OCC (FD-OCC) pattern with adjacent REs in the frequency domain With one OFDM symbol for the at least one DMRS 428, the at least one DMRS 428 may be assigned according to 2-FD-OCC across adjacent REs in the frequency domain for up to six ports. With two OFDM symbols for the at least one DMRS 428, the at least one DMRS 428 may be assigned according to 2-FD-OCC across adjacent REs in the frequency domain and TD-OCC (both {1 1} and {1 −1}) for up to twelve ports. When the number of ports for the at least one DMRS 428 is less than or equal to six, the number of frontloaded DMRS symbols may be one or two. In some cases, the OCC can be applied in both time and frequency domain to enlarge the pool size of DMRS.

As illustrated, the UE 404 may insert a gap 424 in time when sending the msgA 414. The time duration of the gap 424 is configurable, which can be zero, a fraction of an OFDM symbol, or several OFDM symbols. The gap 424 may facilitate transmission of the msgA 414 when the preamble 422 and the payload 426 differ in various ways. In one aspect, the UE 404 may transmit the msgA 414 so that the preamble 422 occupies a different bandwidth portion than the payload 426 (although the bandwidth portion occupied by the preamble 422 may at least partially overlap with the bandwidth portion occupied by the payload 426). For example, the preamble 422 may occupy a relatively smaller bandwidth than the payload 426. In another aspect, the UE 404 may transmit the msgA 414 so that the preamble 422 has a different numerology than the payload 426. For example, the UE 404 may transmit the msgA 414 so that the SCS and/or sampling rate of the preamble 422 is different from that of the payload 426. In still another aspect, the UE 404 may transmit the msgA 414 so that the preamble 422 is transmitted on a beam that is different than a beam on which the payload 426 is transmitted.

In a further aspect, the UE 404 may transmit the msgA 414 so that the preamble 422 is transmitted with a different transmission power than the payload 426—e.g., the UE 404 may implement different power control schemes for the transmission of the preamble 422 and the transmission of the payload 426. For example, the UE 404 may transmit the preamble 422 according to a power scheme that power ramps or increases transmission power as the preamble 422 is transmitted, whereas the UE 404 may transmit the payload 426 with a power control scheme that is based on an MCS applied to the payload 426 (e.g., an MCS-dependent power control scheme, which may be inapplicable to the preamble 422 because the preamble 422 does not include data).

The base station 402 may receive the msgA 414 from the UE 404 in order to initiate the RACH procedure 410. The base station 402 may receive the preamble 422 on the first set of resources. Accordingly, the base station 402 may determine at least one of a size of the payload 426, a TB size in the payload 426, and/or an MCS applied to the payload 426 based on receiving the preamble 422. For example, the base station 402 may access information indicating a correspondence between sequence configurations and/or sets of resources and at least one of payload sizes, TB sizes, and/or MCSs. As described, supra, the sequence configuration of the preamble 422 and/or the first set of resources may indicate the at least one of the size of the payload 426, TB size, and/or MCS. Based on the information indicating the correspondence, the base station 402 may determine the at least one of the size of the payload 426, TB size, and/or MCS.

Based on the preamble 422, the base station 402 may receive and decode the payload 426. In some aspects, the gap 424 in time may facilitate the decoding by the base station 402, e.g., by allowing the base station 402 a period of time to adjust a processing window to correspond to the TB size, adjust the data rate to correspond to the MCS, allocate processing time for a size of the payload 426, etc.

Further, in order to identify the source of the msgA 414, the base station 402 may determine the ID of the UE 404. The base station 402 may determine the ID of the UE 404 based on one or more of (or a combination of) a preamble sequence index associated with the preamble 422, a DMRS sequence index associated with the at least one DMRS 428 in the payload 426, a subset set of a set of bits in the payload 426, a scrambling code applied to the payload, and/or a mask applied to a CRC included in the msgA 414.

In response to the msgA 414, the base station 402 may generate a msgB 416 (second message of 2-step RACH). The base station 402 may generate the msgB 416 to include control information in a PDCCH and data in a PDSCH. The base station 402 may send the msgB 416 to the UE 404 to complete the RACH procedure 410. The UE 404 may receive the msgB 416, and the UE 404 may acquire timing synchronization based on the msgB 416.

Figure 5:
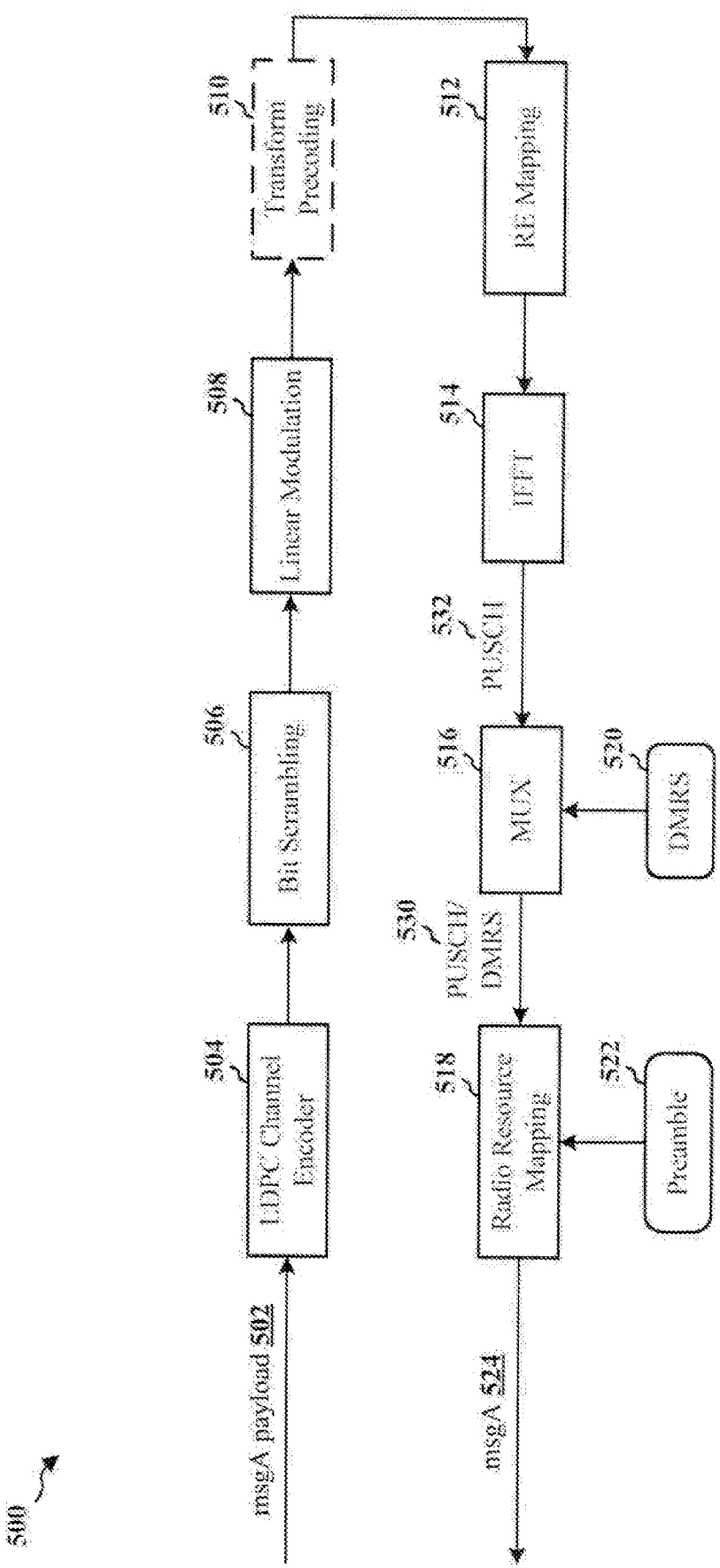
FIG. 5 is a block diagram of a transmit chain for a message of a random access channel procedure, in accordance with certain aspects of the present disclosure.

FIG. 5 illustrates a TX chain 500 associated with transmission of a msgA 524 from a UE to a base station. For example, the msgA 524 may be the msgA 414 sent by the UE 404 to the base station 402, as illustrated in FIG. 4. A UE may generate a payload 502 of a msgA. The payload 502 may include uplink data to be transmitted by the UE to a base station. For example, the payload 502 may include data retrieved from a buffer of the UE. The payload 502 may be provided to the TX chain 500 for transmission to the base station.

In the TX chain 500, a low-density parity-check (LDPC) channel encoder 504 may generate and apply error correcting code to the payload 502. Further, bit scrambling 506 may be applied to the payload 502 in order to provide a level of encryption to the payload 502.

The payload 502 may be modulated with linear modulation 508 to generate a waveform for the payload 502. Optionally, transform precoding 510 may be applied if enabled, which may generate complex-valued symbols for the payload 502. Next, the payload 502 may be mapped to REs on a grid according to RE mapping 512. An IFFT 514 may be applied to produce a PUSCH 532 carrying a time domain OFDM symbol stream for the payload 502.

A multiplexer (MUX) 516 may then multiplex the PUSCH 532 (carrying the payload 502) with at least one DMRS 520 in the time and/or frequency domain, e.g., to provide for channel estimation. In some aspects, the PUSCH/DMRS 530 may be assigned to TBs and an MCS may be applied thereto. The MCS and the size of the TBs may be configured based on an RRC state in which the UE is operating and/or based on a size of the cell on which the UE is operating. For example, a table (e.g., a lookup table) may indicate a respective TB size/MCS configuration for each RRC state and/or cell size and, according to the RRC state of the UE and/or cell size, the TB size and MCS for the PUSCH/DMRS 530 may be configured. The PUSCH/DMRS 530 may be provided for radio resource mapping 518.

A preamble 522 may be generated in association with the PUSCH/DMRS 530. In one aspect, the preamble 522 may be generated based on the PUSCH/DMRS 530. For example, the preamble 522 may be generated based on a sequence configuration that corresponds to the TB size, MCS, and/or size of the payload 502. In some aspects, the sequence configuration may include a cyclic shift, root sequence index, and/or combination thereof for generation of the preamble 522 that corresponds to at least one of the TB size, MCS, and/or size of the payload 502. The sequence configuration may be signaled to the UE in a SIB.

In some aspects, the preamble 522 may be comprised of a plurality of sequences. For example, multiple sequences may be concatenated in the time and/or frequency domain (e.g., by OCC) to construct a "composite" preamble. Each of the individual sequences may be generated using a root sequence index and cyclic shift(s), and then the individual sequences may be time-division multiplexed, frequency-division multiplexed, and/or space-division multiplexed.

At the radio resource mapping 518, the preamble 522 may be assigned to a first set of resources. The first set of resources may be allocated based on the PUSCH/DMRS 530. For example, the first set of resources may be allocated for the preamble 522 based on at least one of the TB size, MCS, and/or size of the payload 502. The first set of resources on which the preamble 522 is carried may correspond to at least one of the TB size, MCS, and/or size of the payload 502 and, therefore, the first set of resources may indicate the at least one of the TB size, MCS, and/or size of the payload 502. The corresponding resource allocation for the first set of resources to indicate the at least one of the TB size, MCS, and/or size of the payload 502 may be signaled to the UE in a SIB.

Further at the radio resource mapping 518, the PUSCH/DMRS 530 may be mapped to a second set of resources, which may be allocated based on a size of a cell on which the UE is operating and/or based on an RRC state in which the UE is operating. In some aspects, the resource allocation for the second set of resources may be signaled by a SIB from a base station to the UE, may be predefined by a math function, or may be predefined by a table (e.g., lookup table) with respect to the preamble 522.

The preamble 522 and the PUSCH/DMRS 530 (carrying the payload 502) may be time-division multiplexed so that the preamble 522 is transmitted on the first set of resources before the PUSCH/DMRS 530 on the second set of resources. In some aspects, a gap in time may be inserted between the preamble 522 and the PUSCH/DMRS 530 at the radio resource mapping 518.

In the aggregate, the preamble 522 and PUSCH/DMRS 530 (and optional gap) may comprise the msgA 524 of a RACH procedure (e.g., 2-step RACH). Subsequently, the TX chain 500 may apply the signal representing the preamble 522 to an antenna for transmission on the first set of resources and may apply the signal representing the PUSCH/DMRS 530 to the antenna for transmission on the second set of resources. In some aspects, different power control schemes may be used for transmission of the preamble 522 and the PUSCH/DMRS 530 of the msgA 524. For example, a power ramping scheme may be applied for transmission of the preamble 522, whereas an MCS-dependent power control scheme may be applied for transmission of the PUSCH/DMRS 530 (in which the payload 502 is carried).

In some aspects, the preamble 522 may occupy a different bandwidth portion than the PUSCH/DMRS. In addition, the preamble 522 may be transmitted on a different beam than the PUSCH/DMRS 530. Further, the numerology and SCS with which the preamble 522 is transmitted may be different than that with which the PUSCH/DMRS 530 is transmitted.

Figure 6:
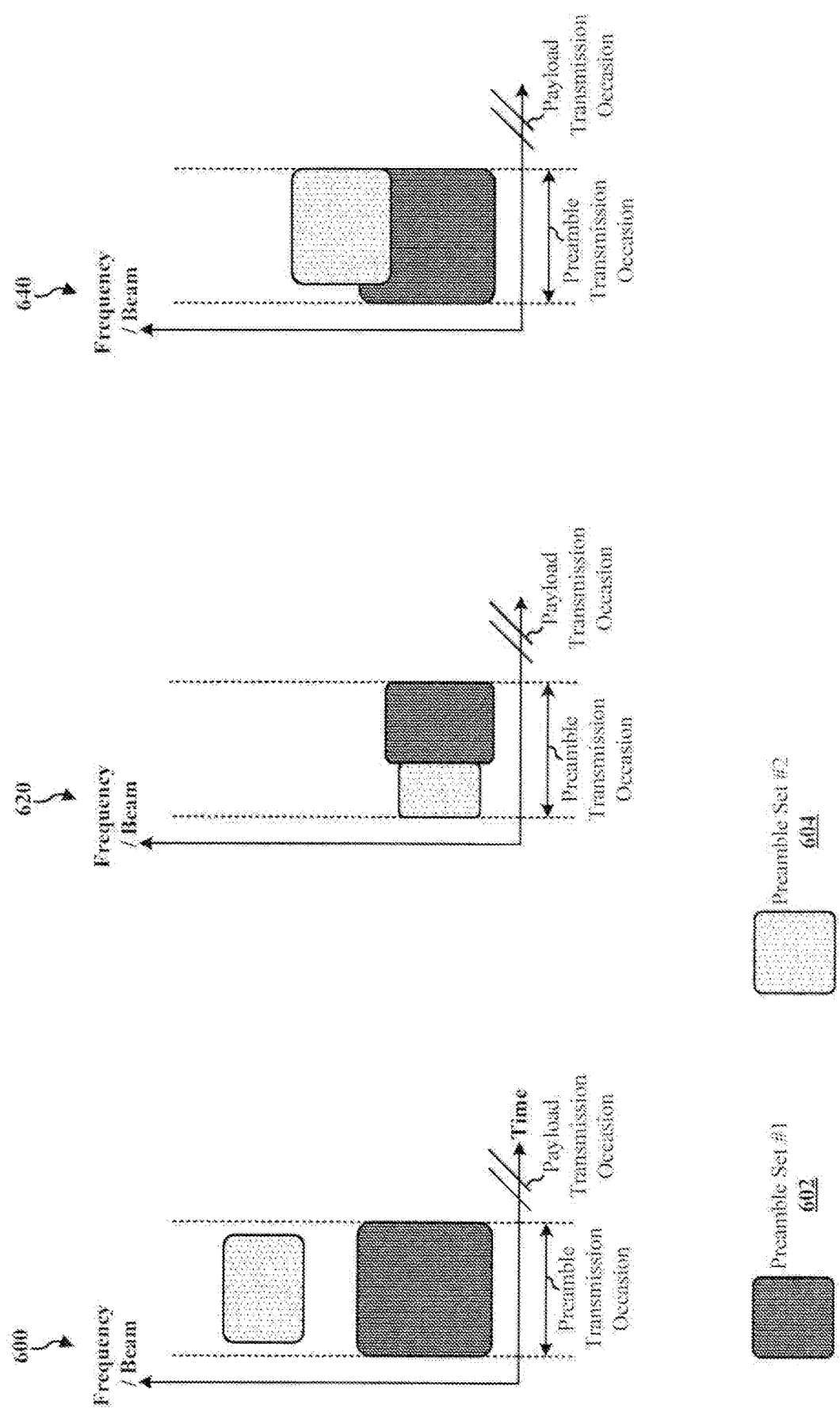
FIG. 6 is a block diagram of resource allocations and sequence configurations for preambles of random access channel procedures, in accordance with certain aspects of the present disclosure.

Turning to FIG. 6, a block diagram illustrates example resource allocations and sequence configurations for preambles transmitted by UEs in RACH procedures (e.g., 2-step RACH procedures). In various aspects, two preamble sets 602, 604 may be transmitted (e.g., by different UEs)—e.g., a preamble set may include a set of sequences, such as a set of sequences generated according to a root sequence index within a first range and/or a number of cyclic shifts within a second range. The first preamble set 602 may be associated with a first TB size/MCS configuration, whereas the second preamble set 604 may be associated with a second TB size/MCS configuration. For example, a preamble corresponding to the first preamble set 602 may be used by UEs to indicate a msgA includes a payload having a first TB size and first MCS, whereas a preamble corresponding to the second preamble set 604 may be used by other UEs to indicate a msgA includes a payload having a second TB size and a second MCS.

A UE (e.g., the UE 404) may transmit a preamble (e.g., the preamble 422) corresponding to the first preamble set 602 or the second preamble set 604 during a preamble transmission occasion, which may be followed in time (e.g., after an optional gap) by a payload transmission occasion during which the UE may transmit a payload (e.g., the payload 426). The UE may transmit a msgA (e.g., the msgA 414) for a RACH procedure (e.g., the RACH procedure 410) by transmitting the preamble in the preamble transmission occasion and transmitting the payload in the payload transmission occasion.

According to a first configuration 600, the first preamble set 602 may be separated from the second preamble set 604 by frequency and/or space/beam but may at least partially overlap in time. For example, a preamble of the first preamble set 602 may be time-division multiplexed on a wireless channel with a preamble of the second preamble set 604. In some aspects, a preamble of the first preamble set 602 may be carried in a first set of subcarriers, whereas a preamble of the second preamble set 604 may be carried in a second set of subcarriers that does not overlap with the first set of subcarriers. However, a preamble of the first preamble set 602 may be carried in a first set of set of symbols occurring during a first portion of the preamble transmission occasion, and a preamble of the second preamble set 604 may be carried in a second set of symbols occurring at least partially in the first portion of the preamble transmission occasion. Thus, in order to indicate the first TB size and first MCS, a UE would assign a preamble to a first set of REs comprised of the first set of subcarriers and the first set of symbols. Similarly, in order to indicate the second TB size and second MCS, a UE would assign a preamble to a second set of REs comprised of the second set of subcarriers and the second set of symbols. Because preambles of the first preamble set 602 may be distinguishable from those of the second preamble set 604 based on subcarrier allocation, the sequence configurations for the first preamble set 602 may at least partially overlap with that of the second preamble set 604 (e.g., a preamble generated for the first preamble set 602 may be the same as a preamble generated for the second preamble set 604).

According to a second configuration 620, the first preamble set 602 may be separated from the second preamble set 604 in time but may at least partially overlap in frequency and/or space/beam. For example, a preamble of the first preamble set 602 may be frequency-division multiplexed on a wireless channel with a preamble of the second preamble set 604. In some aspects, a preamble of the first preamble set 602 may be carried in a first set of subcarriers, and a preamble of the second preamble set 604 may be at least partially carried in the first set of subcarriers. However, a preamble of the first preamble set 602 may be carried in a first set of set of symbols during a first portion of the preamble transmission occasion, whereas a preamble of the second preamble set 604 may be carried in a second set of symbols during a second portion of the preamble transmission occasion that does not overlap with the first portion. Thus, in order to indicate the first TB size and first MCS, a UE would generate a preamble of the first preamble set 602 and/or assign a preamble to a first set of REs comprised of the first set of subcarriers and the first set of symbols. Similarly, in order to indicate the second TB size and second MCS, a UE would generate a preamble of the second preamble set 604 and/or assign a preamble to a second set of REs comprised of the second set of subcarriers and the second set of symbols. Because preambles of the first preamble set 602 may be distinguishable from those of the second preamble set 604 based on symbol allocation, the sequence configurations for the first preamble set 602 may at least partially overlap with that of the second preamble set 604 (e.g., a preamble generated for the first preamble set 602 may be the same as a preamble generated for the second preamble set 604).

According to a third configuration 640, the first preamble set 602 may be separated from the second preamble set 604 by sequence configuration, but may at least partially overlap in time and in frequency and/or space/beam. For example, a preamble of the first preamble set 602 may be code-division multiplexed on a wireless channel with a preamble of the second preamble set 604. In some aspects, a preamble of the first preamble set 602 may be generated according to a first set of RACH parameters, such as a first root sequence index and/or a first number of cyclic shifts. However, preambles of the second preamble set 604 may be generated according to a second set of RACH parameters that includes a different root sequence index and/or a different number of cyclic shifts. Because preambles are distinguishable based on whether the preamble was generated according to the sequence configuration for the first preamble set 602 or the second preamble set 604, preambles of the first preamble set 602 and the second preamble set 604 may overlap in time and/or frequency or space/beam. Thus, a preamble of the first preamble set 602 may occur on a first set of time/frequency resources, and a preamble of the second preamble set 604 may also occur at least partially on the first set of time/frequency resources. In order to indicate the first TB size and first MCS, a UE would generate a preamble according to the sequence configuration of the first preamble set 602. Similarly, in order to indicate the second TB size and second MCS, a UE would generate a preamble according to the sequence configuration of the second preamble set 604. Because preambles of the first preamble set 602 may be distinguishable from those of the second preamble set 604 based on their respective sequence configurations, the time/frequency resources allocated for the first preamble set 602 may at least partially overlap with those allocation for the second preamble set 604 (e.g., a preamble generated for the first preamble set 602 may be allocated resources that at least partially overlap with resources allocated for a preamble generated for the second preamble set 604).

Figure 7:
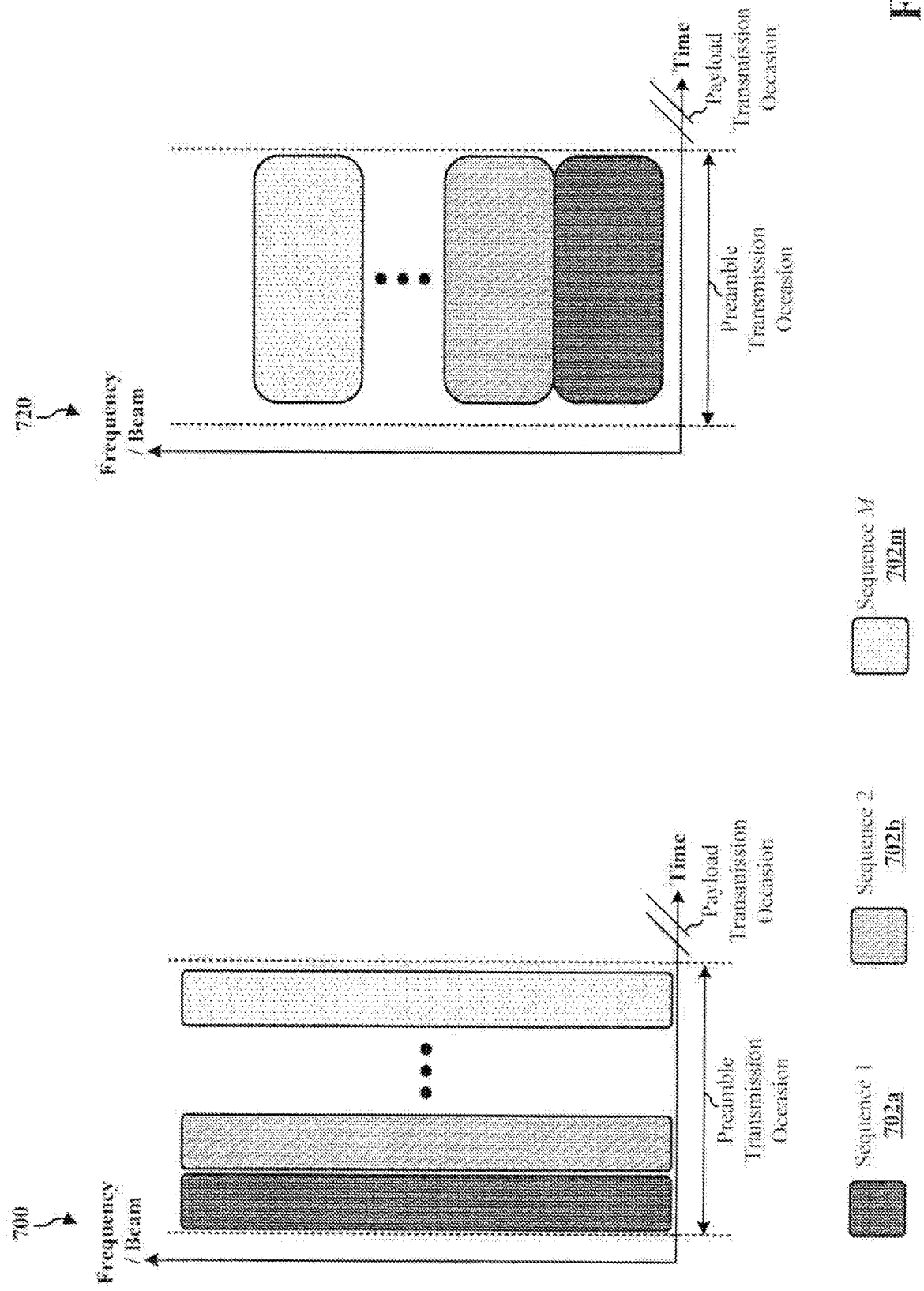
FIG. 7 is a block diagram of composite preambles for messages of random access channel procedures, in accordance with certain aspects of the present disclosure.

FIG. 7 illustrates an example block diagram of configurations 700, 720 of composite sequences. In the context of FIG. 4, the UE 404 may generate the preamble 422 to include a plurality of sequences 702a, 702b, 702m. The UE 404 may then transmit the msgA 414 including the plurality of sequences 702a, 702b, 702m as the preamble 422 during the preamble transmission occasion. Following transmission of the preamble 422, the UE 404 may transmit the payload 426 during the payload transmission occasion.

According to the first configuration 700, a UE may generate three sequences 702a, 702b, 702m. The sequences 702a, 702b, 702m may be respectively generated according to three different sequence configurations—e.g., three different sequence configurations that differ with respect to at least one of a root sequence index and/or a number of cyclic shifts. The UE may concatenate the sequences 702a, 702b, 702m, e.g., using OCC. To distinguish the sequences 702a, 702b, 702m from one another, the UE may time-division multiplex the sequences 702a, 702b, 702m. Accordingly, the UE may transmit a first sequence 702a during a first portion of the preamble transmission occasion, a second sequence 702b during a second portion of the preamble transmission occasion, and an $m^{th}$ sequence 702m during an $m^{th}$ portion of the preamble transmission occasion. In some aspects, the sequences 702a, 702b, 702m may occupy the same set of subcarriers and/or may be transmitted on the same beam(s).

A UE may generate three sequences 702a, 702b, 702m. The sequences 702a, 702b, 702m may be respectively generated according to the same sequence configuration or different sequence configurations—e.g., sequence configurations that differ with respect to at least one of a root sequence index and/or a number of cyclic shifts. The UE may concatenate the sequences 702a, 702b, 702m, e.g., using OCC.

According to the first configuration 700, to distinguish the sequences 702a, 702b, 702m from one another, the UE may time-division multiplex the sequences 702a, 702b, 702m. Accordingly, the UE may transmit a first sequence 702a during a first portion of the preamble transmission occasion, a second sequence 702b during a second portion of the preamble transmission occasion, and an $m^{th}$ sequence 702m during an $m^{th}$ portion of the preamble transmission occasion. In some aspects, the sequences 702a, 702b, 702m may occupy the same set of subcarriers and/or may be transmitted on the same beam(s). According to the second configuration 720, to distinguish the sequences 702a, 702b, 702m from one another, the UE may frequency-division multiplex and/or space-division multiplex the sequences 702a, 702b, 702m. Accordingly, the UE may transmit a first sequence 702a in a first set of subcarriers and/or on a first beam, a second sequence 702b in a second set of subcarriers and/or on a second beam, and an $m^{th}$ sequence 702m in an $m^{th}$ set of subcarriers and/or on an $m^{th}$ beam. In some aspects, sequences 702a, 702b, 702m may at least partially occur during the same time during the preamble transmission occasion.

Figure 8:
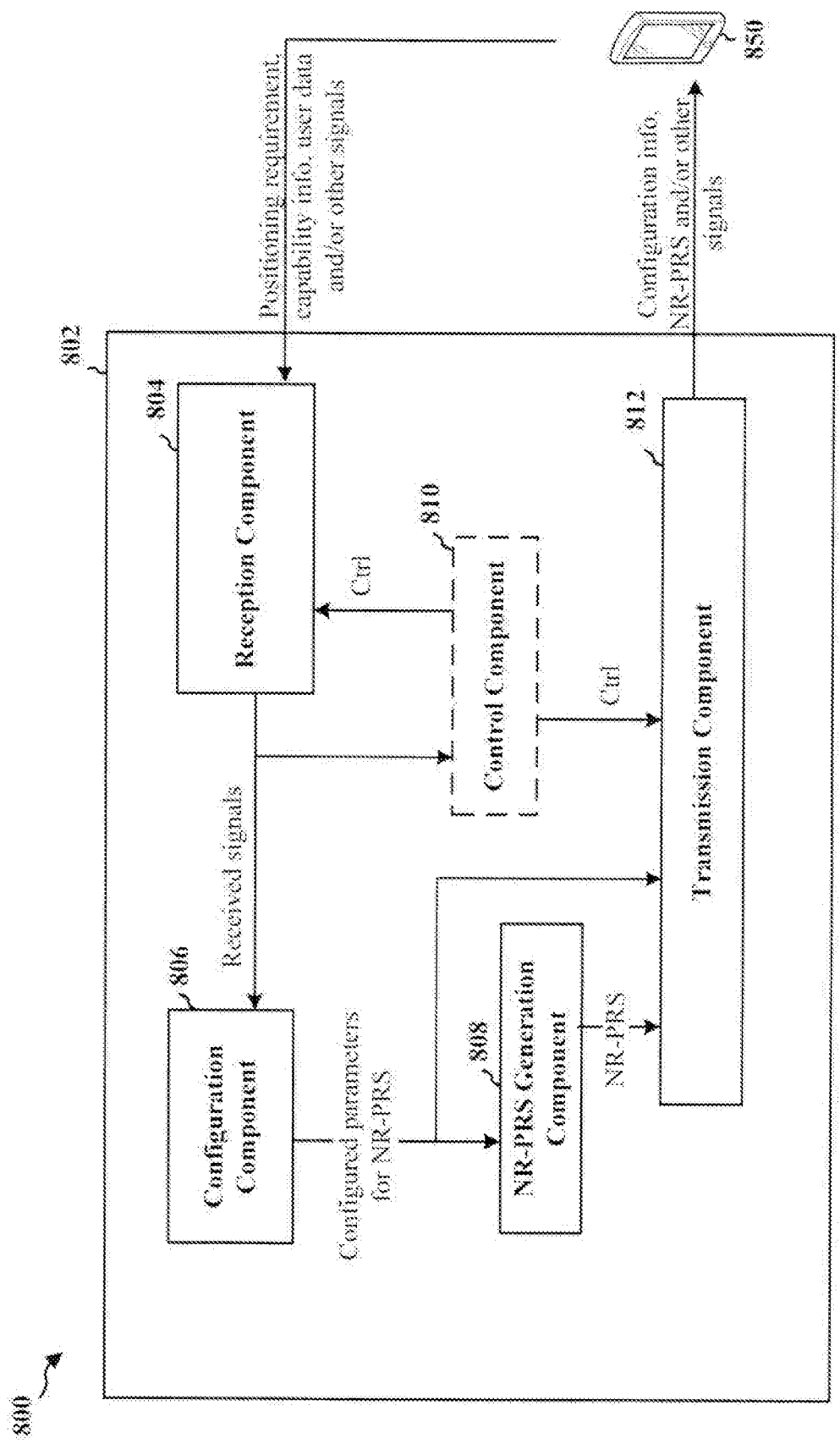
FIG. 8 is an example data flow diagram illustrating data flow between different means/components in an example apparatus, e.g., a base station, in accordance with certain aspects of the present disclosure.

FIG. 8 is an example data flow diagram 800 illustrating the data flow between different means/components in an example apparatus 802. The apparatus may be a base station (e.g., such as base station 180, 310, 1050). The apparatus 802 may include a reception component 804, a configuration component 806, a PRS (e.g., NR-PRS) generation component 808, a control component 810, and a transmission component 812.

The reception component 804 may be configured to receive and process messages and/or other information from other devices such as UE 850. The signals/information received by the reception component 804 may be provided to the configuration component 806, the control component 810 and/or other components of the apparatus 802 for further processing and use in performing various operations at the apparatus 802. In one configuration, the reception component 804 may receive at least one of a positioning requirement or capability information of at least one device (e.g., a UE, including a NR-IoT type device) that needs to perform a positioning operation. The positioning requirement may indicate at least one of a positioning accuracy, a ranging accuracy, and a velocity determination support for the at least one device. In one aspect, the positioning requirement of the at least one device may indicate a positioning requirement level from among a plurality of different possible positioning requirement levels. In one aspect, the capability information may indicate an operating bandwidth (e.g., 5 MHz, 20 MHz etc.) supported by the at least one device.

The configuration component 806 may configure parameters of a PRS (e.g., NR-PRS) based on at least one of the positioning requirement or the capability information. In some configurations, as part of configuring the parameters the configuration component 806 may configure one or more of a waveform type of the NR-PRS, resources on which the NR-PRS will be transmitted, numerology associated with the NR-PRS, bandwidth associated with the NR-PRS, precoding associated with the NR-PRS, or periodicity associated with the NR-PRS. In various configurations, the configuration component 806 may be configured to select the parameters of the NR-PRS on at least one of the received positioning requirement or the capability information. In one aspect, the configuration component 806 may be configured to select a CP-OFDM waveform for the NR-PRS. In some configurations, as part of configuring the parameters, the configuration component 806 may be further configured to select the sequences carried by the CP-OFDM waveform. For example, in one configuration, the configuration component 806 may select a CP-OFDM waveform and one of the following sequences to be carried by the waveform: discrete linear frequency modulation sequences with configurable slope and initial frequency, a multi-carrier phase coded CAZAC sequences, concatenation of chirp sequences in at least one of time or frequency domain, frequency multiplexed sequence of complementary waveforms such as Golay sequences. In some configurations, configuring the parameters associated with the NR-PRS may further comprise configuring a muting pattern for the NR-PRS to reduce inter-cell interference. In some configurations, configuring the parameters associated with the NR-PRS further comprises configuring a frequency hopping pattern for the NR-PRS. The configuration information indicating the configured parameters may be provided by the configuration component 806 to the NR-PRS generation component 808 and the transmission component 812 in some configurations.

The NR-PRS generation component 808 may be configured to generate a PRS (e.g., NR-PRS) having the configured parameters in accordance with aspects described herein, e.g., configured/selected by the configuration component 806 as discussed above. The NR-PRS generated by the NR-PRS generation component 808 may be provided to the transmission component 812 for transmission.

The transmission component 812 may be configured to transmit signals to at least one external device, e.g., UE 850, and other UEs. For example, the transmission component 812 may be configured to transmit the configuration information indicating the configured parameters for the NR-PRS. In some configurations, the at least one device may include one of a plurality of, e.g., NR-IoT devices in a cell served by the apparatus 802, and the plurality of NR-IoT devices may have same or similar positioning requirements. In such configurations, the transmission component 812 may transmit the configuration information indicating the configured parameters for the NR-PRS common to the plurality of NR-IoT devices. In some configurations, the configuration information for NR-PRS may be transmitted in a PDSCH, and a grant for the PDSCH may be transmitted via a group common PDCCH. In various configurations, the transmission component 812 may be further configured to transmit the NR-PRS having the configured parameters. In some configurations, the transmission of the NR-PRS may be a broadcast or multicast to a plurality of devices including the at least one device (e.g., UE 850).

The control component 810 may be configured to control the transmission schedule and/or transmission timing of one or more signals transmitted by the transmission component

812. In some configurations, the control component 810 may be implemented within the transmission component 812. In some configurations, the control component 810 may be configured to control the operation of the apparatus 802 in accordance with aspects described herein, and accordingly control one or more components of the apparatus 802 to operate in accordance with aspects described herein.

The apparatus may include additional components that perform the processes/algorithms discussed herein. As such, each step/block of an algorithm may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
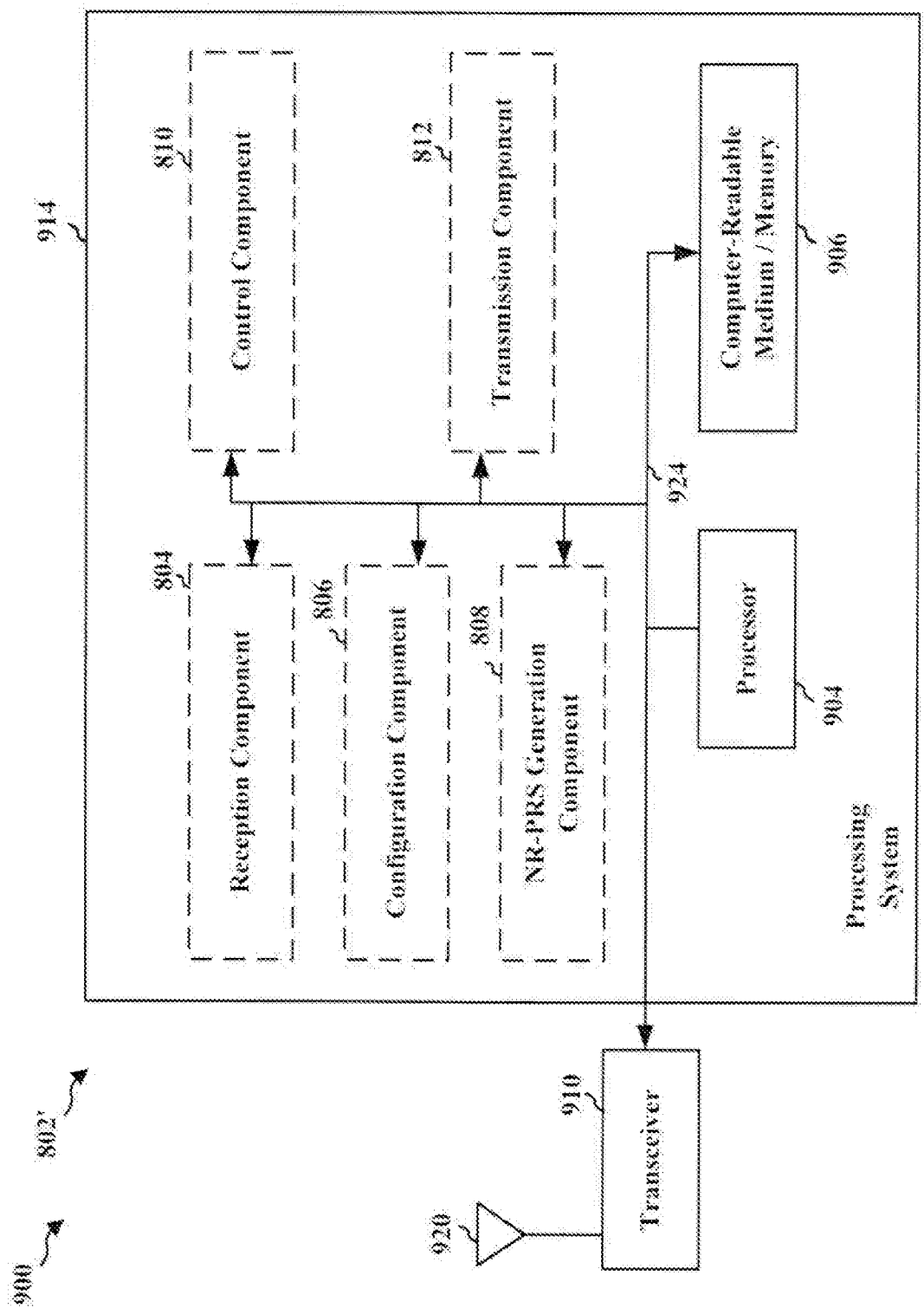
FIG. 9 is a diagram illustrating an example of hardware implementation for an apparatus employing a processing system, in accordance with certain aspects of the present disclosure.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375.

In one configuration, the apparatus 802/802' for wireless communication includes means for receiving at least one of a positioning requirement or capability information of at least one device that needs to perform a measurement operation (e.g., for positioning, ranging, propagation delay, pathloss). In some configurations, the apparatus further comprises means for configuring parameters associated with a NR-PRS based on at least one of the positioning requirement or the capability information, wherein configuring the parameters includes configuring one or more of a waveform type of the NR-PRS, resources on which the NR-PRS will be transmitted, numerology associated with the NR-PRS, bandwidth associated with the NR-PRS, precoding associated with the NR-PRS, or periodicity associated with the NR-PRS. In some configurations, the apparatus further comprises means for transmitting the NR-PRS having the configured parameters.

In some configurations, the means for configuring the parameters is configured to select the parameters for the NR-PRS based on the positioning requirement and capability information of the at least one device. In some configurations, the waveform of the NR-PRS comprises a CP-OFDM waveform, and the means for configuring the parameters is further configured to select the configurations of and the sequences carried by the CP-OFDM waveform. In one configuration, the at least one device comprises a narrow bandwidth NR-IoT device, and the means for configuring the parameters associated with the NR-PRS further configures a muting pattern for the NR-PRS to reduce inter-cell interference. In one configuration, the at least one device comprises a wide bandwidth NR-IoT device, and the means for configuring the parameters associated with the NR-PRS further configures a frequency hopping pattern for the NR-PRS.

In some configurations, the means for transmitting is further configured to transmit configuration information indicating the configured parameters for the NR-PRS common to, e.g., a plurality of NR-IoT devices including the at least one device. In one configuration, the configuration information for NR-PRS is transmitted by the means for transmitting in a PDSCH, and a grant for the PDSCH is transmitted via a group common PDCCH.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
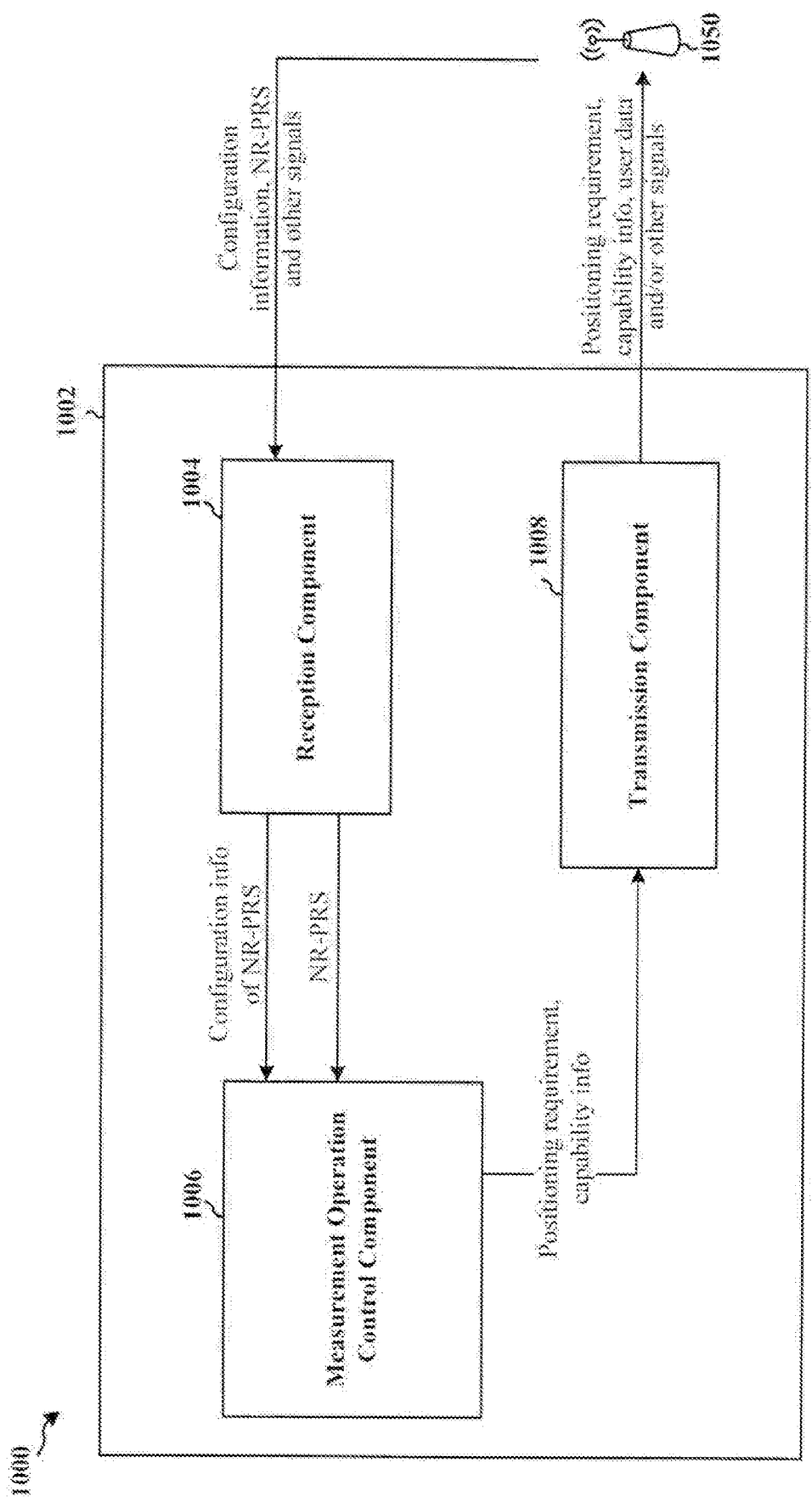
FIG. 10 is an example data flow diagram illustrating data flow between different means/components in an example apparatus, e.g., a UE, in accordance with certain aspects of the present disclosure.

FIG. 10 is an example data flow diagram 1000 illustrating the data flow between different means/components in an exemplary apparatus 1002. The apparatus may be a UE (e.g., such as UE 104, 350, 850). The apparatus includes a reception component 1004, a measurement operation control component 1006, and a transmission component 1008.

The reception component 1004 may be configured to receive control information (e.g., configuration information), data, and/or other information from other devices including, e.g., base station 1050. The signals/information may be received by the reception component 1004 in accordance with the processes/algorithms discussed herein. The received signals/information may be provided to one or more components of the apparatus 1002 for further processing and use in performing various operations in accordance with the processes/algorithms described herein.

The transmission component 1008 may be configured to transmit data, control information and/or other signaling to one or more external devices including, e.g., base station 1050. For example, in some configurations, the transmission component 1008 may be configured to transmit an indication of at least one of a positioning requirement or capability information of the apparatus 1002 to the base station 1050. The positioning requirement may indicate at least one of a positioning accuracy, a ranging accuracy, and a velocity determination support desired by the apparatus. The capability information may indicate an operating bandwidth supported by the UE. In some configurations, the positioning requirement may indicate a positioning requirement level from among a set of different positioning requirement levels, wherein each positioning requirement level in the set may indicate parameters associated with at least one of a ranging accuracy, velocity determination support, and a bandwidth. In some configurations, the positioning requirement level is quantized and indicated via a bitmap, where the bitmap is transmitted in a PUCCH or communicated as a group index in a scheduling request. Thus, in some configurations, the positioning requirement and/or capability information of the apparatus may be indicated through such a bitmap. In some such configurations, the transmission component 1008 may transmit the bitmap communicating the positioning requirement level corresponding to the apparatus 1002.

In one configuration, the reception component 1004 may be configured to receive, from the base station 1050, configuration information indicating configured parameters for a NR-PRS, the parameters having been configured based on at least one of the transmitted positioning requirement or the capability information of the apparatus 1002. In some configurations, the apparatus 1002 is one of a plurality of NR-IoT devices, e.g., in a cell served by the base station 1050, and the plurality of NR-IoT devices may have same or similar positioning requirements. In one such configuration, the reception component 1004 may receive the configuration information indicating the configured parameters for the NR-PRS common to, e.g., the plurality of NR-IoT devices. In some configurations, the configuration information for NR-PRS may be received in the system information carried in a PDSCH, and a grant for the PDSCH may be received via a group common PDCCH. The received configuration information may be provided to the measurement operation control component 1006 for use in controlling various operations of the apparatus 1002 in accordance with the processes/algorithms described herein. The received configuration information (e.g., one or more parameters) may also be used by reception component 1004 to monitor for, receive and decode the NR-PRS from the base station 1050.

In various configurations, the reception component 1004 may be further configured to receive the NR-PRS having the parameters configured based on at least one of the transmitted positioning requirement or the capability information of the apparatus 1002. The configured parameters may include one or more of a waveform type of the NR-PRS, resources on which the NR-PRS will be transmitted, numerology associated with the NR-PRS, bandwidth associated with the NR-PRS, precoding associated with the NR-PRS, or periodicity associated with the NR-PRS. configured parameters. In some configurations, the NR-PRS may be received in a broadcast or multicast from the base station 1050. In one configuration, the waveform of the received NR-PRS comprises a CP-OFDM waveform. In some such configurations, the CP-OFDM waveform of the received NR-PRS comprises one of the following sequences: discrete linear frequency modulation sequences with configurable slope and initial frequency, a multi-carrier phase coded CAZAC sequences, concatenation of chirp sequences in at least one of time or frequency domain, frequency multiplexed sequence of complementary waveforms such as Golay sequences. In some configurations, the parameters associated with the NR-PRS may further comprise a muting pattern for the NR-PRS. In some configurations, the parameters associated with the NR-PRS may further comprise a frequency hopping pattern for the NR-PRS.

The measurement operation control component 1006 may be configured to control, e.g., positioning, ranging, propagation delay, and/or pathloss determination and related operations in accordance with the techniques described herein. For example, the measurement operation control component 1006 may be configured to perform at least one of a positioning operation, a ranging operation, or a velocity determination, using the received NR-PRS. The measurement operation control component 1006 may be further configured to control the transmission/reception of one or more positioning related signals at the apparatus 1002. In some configurations, the measurement operation control component 1006 may be configured to control the operation of the apparatus 1002 in accordance with the processes/algorithms described herein, and accordingly control one or more components of the apparatus 1002 to operate in accordance with the processes/algorithms described herein.

The apparatus may include additional components that perform each of the processes/algorithms discussed herein. As such, each process/algorithm may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
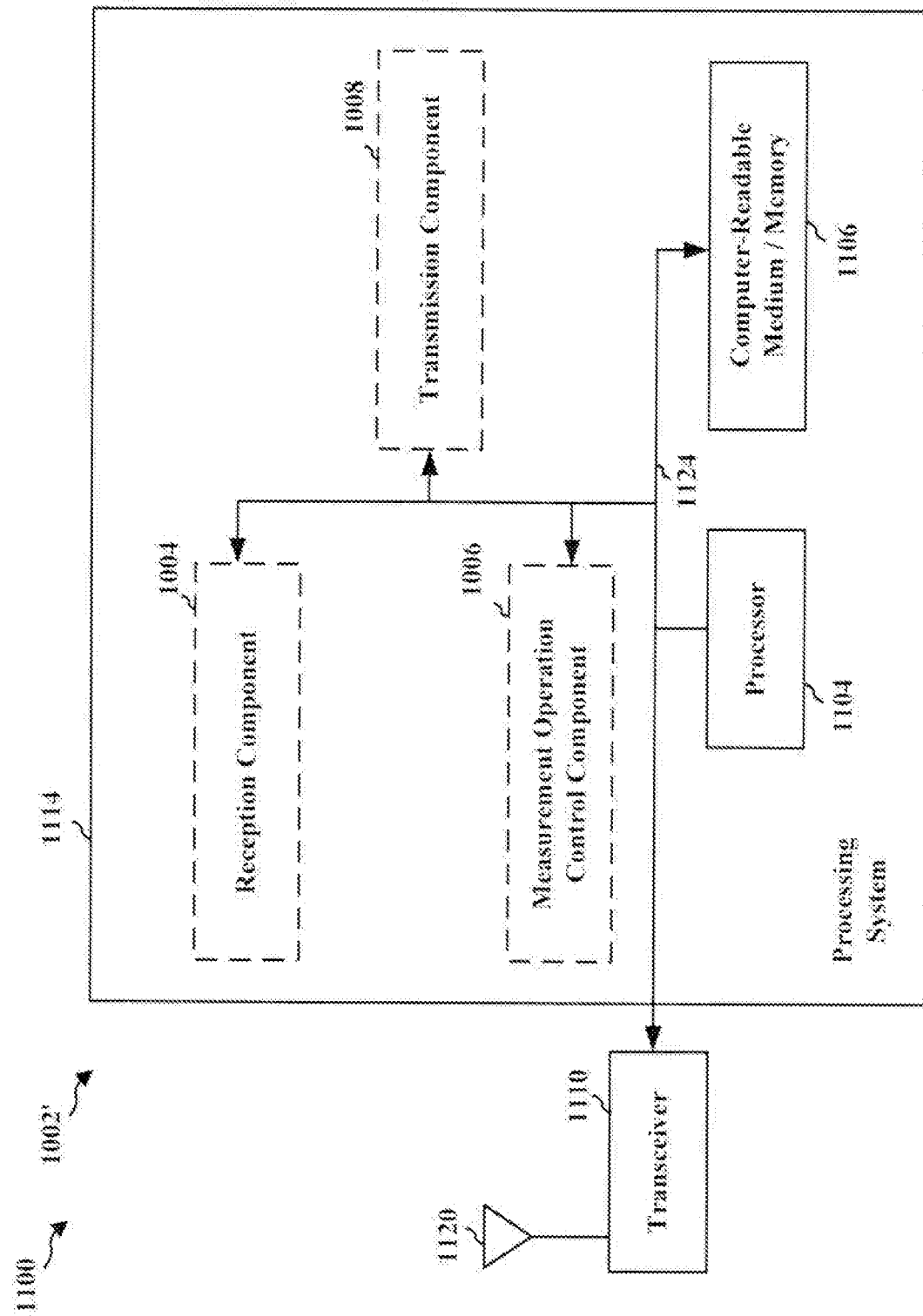
FIG. 11 is a diagram illustrating an example of hardware implementation for an apparatus employing a processing system, in accordance with certain aspects of the present disclosure.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication is a UE comprising means for transmitting an indication of at least one of a positioning requirement or capability information of the UE, e.g., to a base station. The apparatus 1002/1002' may further comprise means for receiving a NR-PRS having parameters configured based on at least one of the positioning requirement or the capability information of the UE, the configured parameters including one or more of a waveform type of the NR-PRS, resources on which the NR-PRS will be transmitted, numerology associated with the NR-PRS, bandwidth associated with the NR-PRS, precoding associated with the NR-PRS, or periodicity associated with the NR-PRS. In some configurations, the positioning requirement may indicate a positioning requirement level from among a set of different positioning requirement levels, wherein each positioning requirement level in the set may indicate parameters associated with at least one of a ranging accuracy, velocity determination support, and a bandwidth. In some configurations, the positioning requirement level is quantized and indicated via a bitmap, where the bitmap is transmitted in a PUCCH or communicated as a group index in a scheduling request. Thus, in some configurations, the positioning requirement and/or capability information of the UE (apparatus 1002) may be indicated through such a bitmap. In some such configurations, the means for transmitting may be configured to transmit, e.g., to the base station, the bitmap communicating the positioning requirement level corresponding to the apparatus 1002.

In some configurations, the means for receiving may be further configured to receive, from a base station, configuration information indicating configured parameters for the NR-PRS, the parameters having been configured by the base station based on at least one of the transmitted positioning requirement or the capability information of the UE. In some configurations, the UE (apparatus 1002) is one of a plurality of, e.g., NR-IoT devices, e.g., in a cell served by the base station, and the plurality of NR-IoT devices may have same or similar positioning requirements. In one such configuration, the means for receiving may be configured to receive configuration information indicating the configured parameters for the NR-PRS common to the plurality of NR-IoT devices. In some configurations, the configuration information for NR-PRS may be received in the system information carried in a PDSCH, and a grant for the PDSCH may be received via a group common PDCCH.

In one configuration, the apparatus 1002/1002' may further comprise means for performing at least one of UE positioning, ranging, or a UE velocity determination using the received NR-PRS.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
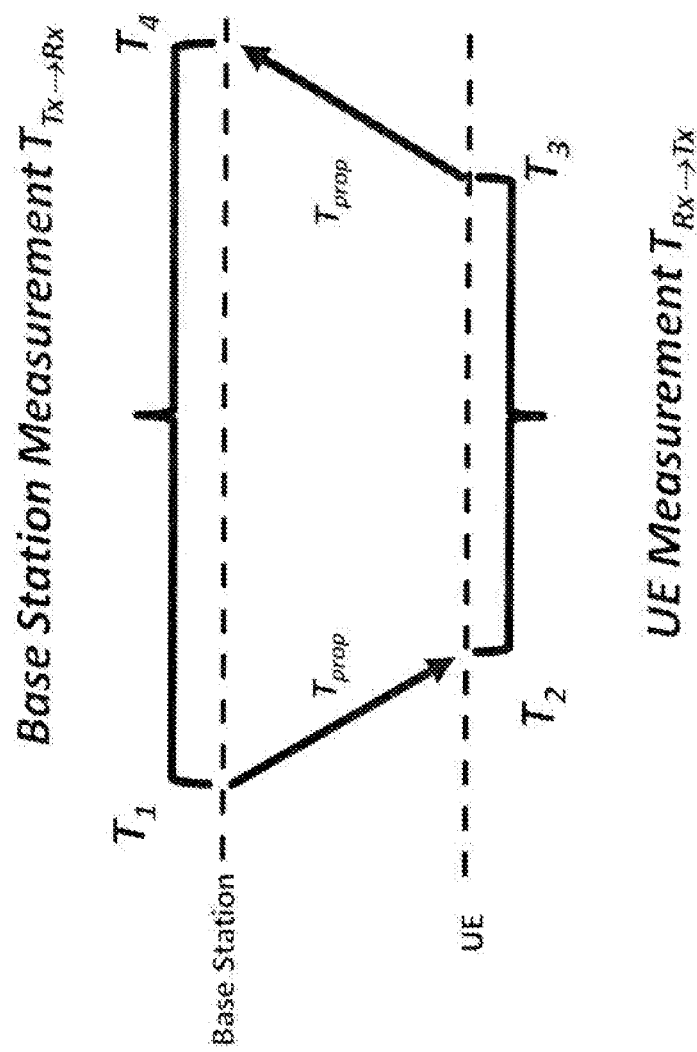
FIGS. 12-14 illustrate example signal measurements, in accordance with certain aspects of the present disclosure.

FIG. 12 illustrates example signal measurement, e.g., for round trip time (RTT) for a cell. In this example, a base station may transmit a downlink (DL) signal (e.g., a DL reference signal such as PRS, or another type of DL signal) at $T_1$. A UE may measure TOA for the DL signal, e.g., received, at $T_2$. The difference between $T_2$ and $T_1$ may be referred to as, e.g., propagation, propagation time, or propagation delay. The UE may transmit an uplink (UL) signal (e.g., an UL reference signal such as PRS, or another type of UL signal) at $T_3$ and report $T_{Rx \to Tx} = T_3 - T_2$. The base station may measure TOA for the UL signal at $T_4$ and determine $T_{Tx \to Rx} = T_4 - T_1$. The base station may calculate distance from the UE: $d = 1/2c(T_{Tx \to Rx} - T_{Rx \to Tx})$.

Figure 13:
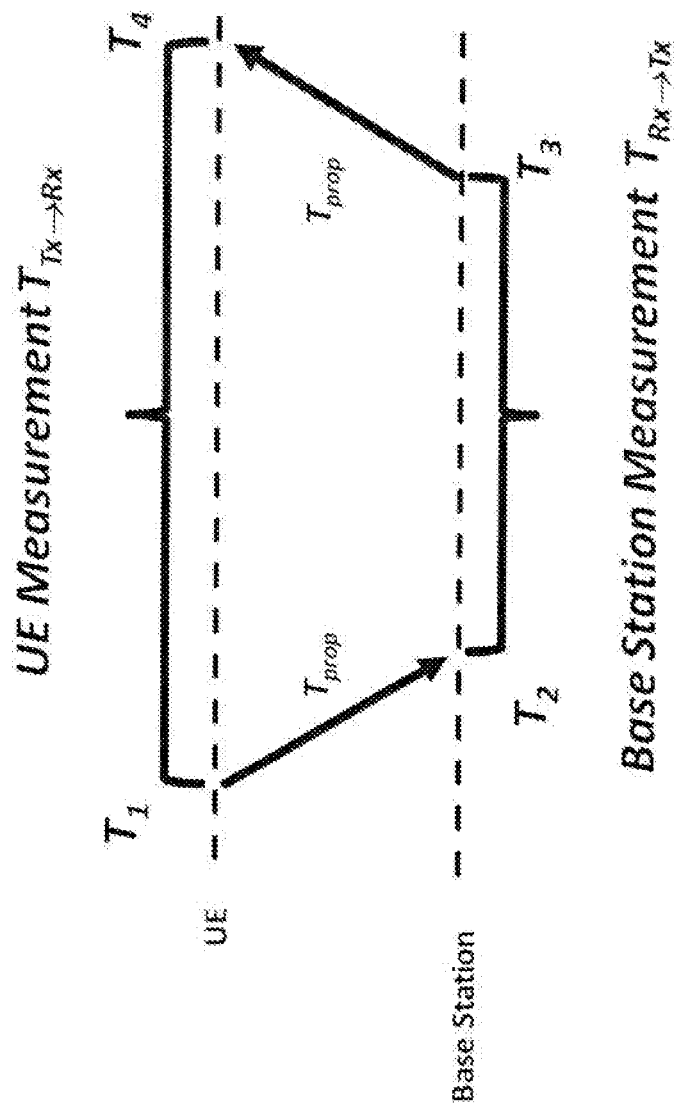

FIG. 13 illustrates example signal measurements, e.g., RTT for a cell. In this example, a UE may transmit an UL signal (e.g., an UL reference signal such as PRS, or another type of UL signal) at $T_1$. A base station may measure TOA for the UL signal at $T_2$. The base station may transmit a DL signal (e.g., a DL reference signal such as PRS, or another type of DL signal) at $T_3$ and indicate $T_{Rx \to Tx} = T_3 - T_2$. The UE may measure TOA for the DL signal at $T_4$ and determine $T_{Tx \to Rx} = T_4 - T_1$. The UE may calculate distance from the base station: $d = 1/2c(T_{Tx \to Rx} - T_{Rx \to Tx})$.

Figure 14:
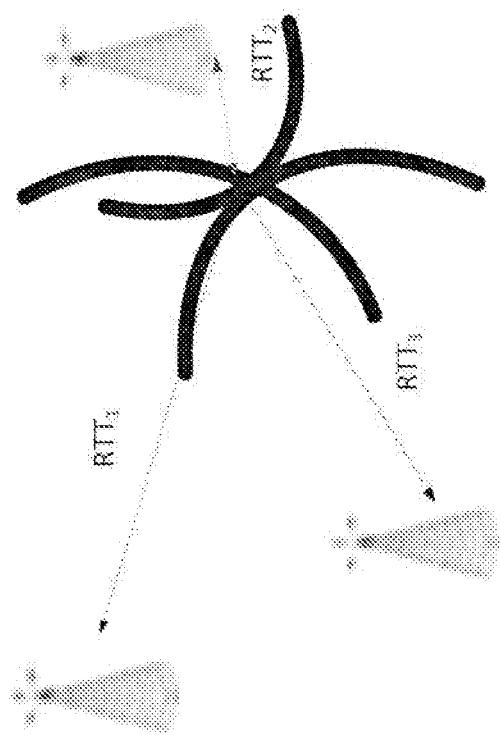

FIG. 14 illustrates example signal measurements, e.g., for positioning across multiple cells. Reference signals (e.g., PRS) or another type of signal may be used to measure round trip time between a base station and a UE (for example, as illustrated in FIG. 11 and/or FIG. 12). This RTT procedure may be repeated across multiple cells. Distance to each cell along with location of each cell may be used for, e.g., multi-lateral positioning. Further pruning or averaging across multiple observations may improve estimates. Multiple observations may be based on, e.g., more cells, AOA (angle of arrival)/AOD (angle of departure), or more time instances.

As discussed, 2-step RACH may be applicable to cells of any cell size, to UEs in all states (e.g., RRC Connected, RRC Inactive, RRC Idle), and/or to UEs regardless of whether they have valid timing advance (TA) information or not. For 2-step RACH, the transmission of msgA may not be able to leverage timing advance (TA) information indicated by the network. TA information may not be available or up-to-date for 2-step RACH msgA. This may degrade the performance of 2-step RACH, especially, e.g., for an asynchronous UE that is sharing resources in time/frequency/space domains. In accordance with aspects of the present disclosure, leveraging signals/signal measurements (e.g., in uplink and/or downlink) may enhance TA estimation for msgA transmission. The signals that may be leveraged may include signals related to positioning measurements, synchronization, and/or system information indication. For example, positioning reference signal(s) (PRS) may be leveraged, and measurements (e.g., RTT measurements, ranging measurements, or other types of measurements) may be based on PRS. Details of PRS for 5G NR are being discussed in standards development meetings. Measurements may also be based on other signals such as SSB/SIB/CSI-RS that may be pre-existing and may have already been configured, and such measurements may be independent of or in conjunction with PRS. These measurements, whether based on PRS or another signal, that may be leveraged to enhance random access may be referred to as positioning measurements. Based on the techniques discussed herein, random access enhancements such as improved TA estimation, lower latency, and enhanced spectral efficiency may be achieved due to, e.g., more efficient selection of CP/preamble format and more efficient multiplexing of a UE performing 2-step RACH. As discussed, other enhancements, such as better overall system performance, may also be achieved based on the techniques discussed herein.

The RACH procedure 410 may differ in some aspects from other RACH procedures, such as RACH procedures in which four messages are exchanged (e.g., 4-step RACH). For example, in 4-step RACH, message 2 (msg2) from base station carries timing advance information, e.g., for PUSCH transmission by UE in message 3 (msg3). However, since in 2-step RACH, PUSCH transmission is sent by UE in the first message (msgA), there may be no timing advance information for transmission of msgA. Therefore, timing adjustment information (e.g., timing offset estimation, propagation delay) for the UE before its transmission of msgA may improve RACH and overall system performance.

To determine timing adjustment information, measurement of signals (e.g., downlink signals or uplink signals) may be needed. For UEs in inactive state, idle state, or moving to a different cell in the same tracking area, there may not be a sufficient number of measurement opportunities, because such UEs may not have access to, for example, CSI-RS, which is available to UEs in connected state, and the base station may not have the full connection context for such UEs, so timing control or power control for such UEs may be more difficult than UEs in connected state. Signals that are available to UEs in inactive or idle state include synchronization signal block (SSB) (which includes PSS, SSS, and PBCH) and SIB. However, measurements based on SSB may not be good enough. To improve timing offset estimation accuracy, measurements using PRS may be leveraged, according to certain aspects of the present disclosure, thereby enhancing open loop rate adaptation, power control, timing control, and overall system performance.

For example, PRS may be used in, e.g., round trip time (RTT), OTDOA, UTDOA, time of arrival, or time of departure techniques. RTT, for example, may be repeated across cells and/or in multi-TRP transmissions. Examples of RTT procedures are illustrated in FIGS. 12-14. According to certain aspects of the present disclosure, techniques for PRS transmission that enable more accurate measurement by a UE for performing timing adjustments for random access and techniques for combining PRS transmission with random access are presented. Such techniques allow UEs (even UEs in idle state or inactive state) to better estimate signal propagation and pathloss. UE may perform functions such as power control, timing control, link adaptation (e.g., which MCS to choose for payload transmission in msgA) based, at least in part, on estimates of propagation delay or pathloss, for example.

In accordance with an aspect of the present disclosure, cell-specific PRS may be used, to perform measurements or estimates of information, such as propagation delay or pathloss, that improves timing control or power control, etc. for random access. For example, for random access that can be pre-configured (e.g., RACH occasions), the base station can schedule PRS transmission with the random access, so that they are bundled together, e.g., scheduling PRS to be transmitted before the random access, so that the PRS (e.g., DL or UL PRS) can be used to assist the random access or to trigger random access. The PRS (e.g., DL or UL PRS) transmission, reception, or associated processing may be part of the random access.

In an aspect, PRS may be transmitted by serving cell and neighbor cells to a UE (e.g., a UE that is to perform random access) in idle, inactive, or connected state. E-CID (enhanced cell ID) information may be conveyed by the PRS, whose configuration may be cell-specific and may be detected by UE even in, e.g., idle state. A mapping of E-CID to PRS format may be determined by network, and used by both base station and UE. For example, a base station transmitting the PRS may determine which PRS format to use, and a UE receiving the PRS, may determine which base station or cell transmitted the PRS, based on the PRS format. If the UE receives multiple PRS from multiple base stations, the UE may determine its position based on location determination techniques. After UE determines its position, it may determine the propagation distance, and thereby deriving the propagation delay. Based on the propagation delay, the UE can determine its timing offset to synchronize with the base station. Based on the timing offset, the UE can determine to, e.g., backoff or advance its transmission timeline (e.g., msgA transmission or msg1 transmission), so that its timing or signal arrival time is aligned with other UEs, which helps, e.g., to reduce interference and therefore improves the UE's performance. For UE in RRC_CONNECTED state, CSI-RS or other reference signals can be transmitted together with SSB/SIB/PRS. Thus, for a UE in connected state, it has more opportunities for measurements because of more reference signals used for performing the measurements are available. As discussed, these measurements may be used for, e.g., deriving pathloss and propagation time.

According to certain aspects of the present disclosure, in addition to using PRS for measurements to improve random access, PRS (e.g., DL or UL PRS) may be transmitted to trigger random access, e.g., for UEs in idle state or inactive state. When a base station is expecting to receive random access signaling (e.g., 2-step RACH signaling) from a UE, it may transmit PRS, e.g., with a specific PRS format or pattern, and when the UE receives the PRS, e.g., with the specific PRS format or pattern, it may determine that it is allowed to proceed with the random access.

According to certain aspects of the present disclosure, PRS may be transmitted periodically, semi-periodically, or in configured patterns (e.g., RRC configured patterns). Format of PRS (e.g., PRS sequence, format of PRS sequence, information carried by PRS) may be a function of E-CID and/or power class. For example, 5G NR base station power class classification may include wide area base station, medium range base station, and local area base station.

According to certain aspects of the present disclosure, when a cell or base station is transmitting PRS, its power class information may be, e.g., signaled in SIB, or indicated by the PRS format, or jointly indicated by SIB and PRS. Therefore, when a UE performs measurements of energy of a reference signal (e.g., PRS or another reference signal), it may determine from the SIB/PRS format the transmit power of the base station. Having more accurate information about transmit power may help to derive, for example, pathloss, more accurately, as received power divided by transmit power may be indicative of the pathloss. Sometimes default value of transmit power is not accurate enough, so additional information such as power class may help the UE to measure or estimate propagation delay or pathloss more accurately. In an aspect, information related to power class of the base station and/or other information (e.g., for E-CID) may be added to PRS, for example, as payload and/or as part of the sequence. For example, the base station may select one subset of PRS sequences for one power class, a different subset of PRS sequences for another power class, and transmit a PRS sequence from the selected subset of PRS sequences. The device receiving the PRS (e.g., the UE in the case of downlink PRS) may perform cross correlation based on, e.g., peaks of the PRS sequence. For example, it may associate a peak of a cross correlation with a subset of PRS sequences on which the received PRS is based, and determine the information related to power class and/or other information carried by the PRS, based on the PRS format to power class (and/or, e.g., E-CID) mapping data structure. Such a determination of information conveyed by PRS (e.g., as part of the PRS sequence) may be faster and less complex than decoding the same information carried in, for example, SIB, leading to less processing. The additional information may also be conveyed jointly, for example, by PRS and SIB.

According to certain aspects of the present disclosure, by processing SSB/SIB/PRS and detecting the power class of the serving cell, UE can perform measurements (e.g., DL measurements) at least for, e.g., pathloss and single-trip propagation delay to serving cell. Power class information of the cell may be indicated by, e.g., SIB, format of the PRS, or combinations thereof. The UE may process the SIB and/or the PRS format to obtain the power class information. To support this functionality, the SIB may need to carry information in its payload that indicates power class, and/or there may need to be a PRS configuration data structure that, e.g., map the PRS information to power class information. For example, based on such a data structure, for a power class, a corresponding PRS sequence to use may be determined.

For a UE in any state, the DL measurements to enhance random access may be based at least on SSB, SIB, or PRS, because these signals may be transmitted on the DL regardless of which state the UE is in. Other types of reference signals, such as CSI-RS, TRS (tracking reference signal), and PTRS (phase tracking reference signal), may only be used by a UE in connected state. Therefore, PRS may be a reference signal that can be used in all UE states (e.g., RRC states) to make measurements to enhance random access. In an aspect, OTDOA based on serving and neighbor cells may be used for the measurements. In another aspect, DL power and ToA estimation from a serving cell only may be used for the measurements.

Based on processing of the PRS, processing of other signals, or joint processing of the PRS with other signals (e.g., MIB, SIB), UE may determine information about pathloss and propagation delay, as discussed. Because pathloss may be based on a RSTD (reference signal time difference) measurement and may not be sensitive to bandwidth (e.g., results of DL PRS measurements may be used to improve uplink transmission of 2-step RACH, even in FDD where uplink and downlink uses different bandwidths). The UE may determine its transmit power and estimate/measure the pathloss to the base station, and based on the pathloss, determine an appropriate MCS configuration to use, determine power control power mechanisms, e.g., open loop, full pathloss compensation, fractional pathloss compensation, determine offset of MCS to be applied, and/or determine UE's resource allocation. For example, if a UE's payload size is fixed, and MCS is lower, which means code rate is lower and more redundancy is needed, then more RBs or slots may be needed to transmit that payload size. If pathloss is estimated/measured to be small, UE may use higher MCS, which means higher modulation and code rate and less resources because channel conditions are better, resulting in more compact resource allocation for RACH. Also, as discussed, for timing control, by determining propagation delay, the UE may determine to advance or delay (e.g., granularity or range of timing advance) its transmission (e.g., of msgA) to make its arrival at the base station more aligned in time with other UEs. Such determinations by the UE may be done by each UE in a distributed manner, without scheduling, e.g., by a base station.

As discussed, based on PRS-aided estimation/measurements of information such as pathloss and propagation delay, mapping/selection rules for MCS configuration, resource allocation, timing control, etc. may be detected or determined. Based on this, UE may perform, for example, uplink power control, timing control, and link adaptation (e.g., selection of transmit power, open-loop power control (OLPC), TA, MCS), for its transmission (e.g., of msgA). The preamble selection and resource mapping for the transmission (e.g., msgA) may depend, at least in part, on the payload size, MCS, buffer status, and UE state (e.g., RRC states).

To facilitate OTDOA measurement by UE performing RACH, PRS transmissions from serving cell and neighbor cell may be coordinated by the network. The network may signal a PRS transmission schedule to the UE. The network may schedule PRS (e.g., DL or UL PRS) transmissions together with RACH occasions (e.g., in time, frequency, beam). To facilitate DL power and ToA estimation by a UE performing RACH, additional or side information regarding the PRS transmission (e.g., beamforming gain, transmit power) may be signaled by SIB, or RRC configured, or by generating or determining a mapping data structure (e.g., a table, an array, a bitmap, a list) for the PRS format. The mapping or mapping rule between power measurement and propagation distance (e.g., base station to UE) may be parameterized and signaled by, e.g., SIB, which may be a function of carrier frequency (e.g., FR1 or FR2) and cell deployment (e.g., urban, suburban, base station antenna configurations). For example, there may be one mapping, mapping rule, or mapping table for FDD, and there may be one mapping, mapping rule, or mapping table for TDD.

In accordance with aspects of the present disclosure, e.g., for a UE in connected state, uplink PRS may be transmitted by the UE before the first message of random access (e.g., msgA). The uplink PRS and preamble of the first message of random access may occupy the same or different radio resources. The uplink PRS may be used, e.g., by a base station to perform estimation/measurement of information such as propagation delay an pathloss to enhance random access, as discussed. In an aspect, the UE may enter an idle or inactive state for power saving, and may transmit at least one UL PRS upon the UE entering a connected state. The transmitted UL PRS may help the BS determine whether information it has about the UE (e.g., location information) is up to date. The BS may leverage information conveyed by the UL PRS transmitted by the UE and combine the information with previous location or position information (e.g., prior to random access) it has about the UE, to determine a current location or position or other information related to the UE (e.g., so that an adjustment may be performed for an ensuing random access). Also, as indicated, the techniques discussed herein based on PRS and/or other signals may also apply to 4-step RACH. Because 4-step RACH has an uplink transmission (msg1) and a downlink transmission (msg2) before msg3, forming a closed loop which helps it to be in a better position for, e.g., link adaptation and power control than 2-step RACH. However, measurements based on PRS and/or other signals discussed herein may be used by a UE performing 4-step RACH to provide additional or partial information for timing control, power control, link adaptation. Such information may be sufficient for the UE to maintain uplink synchronization, and may alleviate or eliminate the need for the timing advance information that is sent as part of 4-step RACH. For example, msg3 transmission in 4-step RACH may leverage this information for open-loop rate adaptation and power control, and msg1 transmission in 4-step RACH may leverage this information for open-loop timing control, which may partially or completely reduce the latency and signaling overhead for TA, leading to higher spectral efficiency and reduced latency. Also, for example, a small cell base station, or another type of base station, may not need to transmit timing advance information as part of msg2 of 4-step RACH, thus reducing signaling overhead for 4-step RACH.

Figure 15:
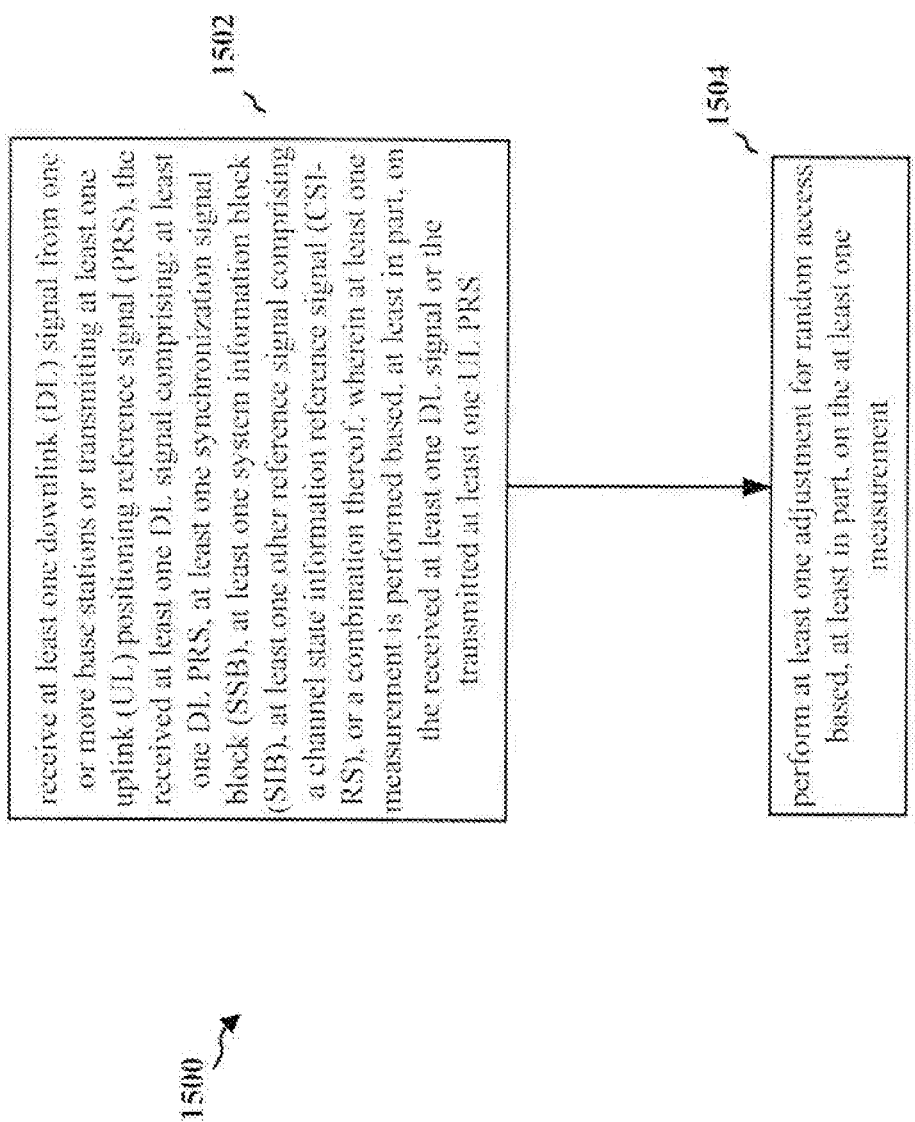
FIG. 15 illustrates example operations for a UE, in accordance with certain aspects of the present disclosure.

FIG. 15 illustrates example operations 1500, e.g., by a UE (such as a UE described in connection with the aforementioned figures), in accordance with certain aspects of the present disclosure. Operations 1500 may begin with a UE receiving at least one downlink (DL) signal from one or more base stations or transmitting at least one uplink (UL) PRS (1502). The received at least one DL signal may comprise: at least one DL PRS, at least one synchronization signal block (SSB), at least one system information block (SIB), at least one other reference signal comprising a channel state information reference signal (CSI-RS), or a combination thereof. At least one measurement may be performed based, at least in part, on the received at least one DL signal or the transmitted at least one UL PRS. For example, a measurement may be performed based, at least in part, on the at least one DL signal by the UE. For example, a measurement may be performed based, at least in part, on the at least one UL PRS signal by the BS. The UE, or a BS, may perform at least one adjustment for random access based, at least in part, on the at least one measurement (1504). The at least one adjustment may include, for example, time control, power control, resource selection, or link adaptation.

In an aspect, the UE may transmit a first message to at least one base station of the one or more base stations to initiate the random access, the first message comprising a preamble and a payload; and receive a second message associated with completion of the random access, the second message transmitted by the at least one base station in response to the first message.

In an aspect, the preamble may be transmitted on a random access channel (RACH), the payload is transmitted on at least one of an uplink control channel or an uplink shared channel, and the second message includes control information in a DL control channel and data in a DL shared channel.

In an aspect, the UE may transmit a first message to at least one base station of the one or more base stations to initiate the random access, the first message comprising a preamble, may receive a second message associated with a random access response, the second message transmitted by the at least one base station in response to the first message and comprising a reduced payload size for timing advance, may transmit a third message in response to the second message, the third message comprising information transmitted on an uplink shared channel, and may receive a fourth message associated with completion of the random access, the fourth message transmitted by the at least one base station in response to the third message.

In an aspect, a triggering event for the random access may be based, at least in part, on the at least one DL PRS or the at least one UL PRS.

In an aspect, the at least one DL PRS or the at least one UL PRS may be transmitted periodically, semi-periodically, or based on a configured pattern.

In an aspect, a format of the at least one DL PRS may be based, at least in part, on at least one of a power class or a beam forming gain of a base station, of the one or more base stations, transmitting the at least one DL PRS, and wherein power class information for the base station may be indicated by at least one of: a system information block (SIB), a format of the at least one DL PRS, or a combination thereof.

In an aspect, the at least one UL PRS, and a random access preamble, transmitted by the UE in a first message to initiate the random access, may occupy the same time resources, the same frequency resources, or a combination thereof.

In an aspect, the UE may process the at least one DL PRS, or the at least one DL PRS and at least one of: the at least one SSB, the at least one SIB, or a master information block (MIB), wherein performing the at least one measurement may comprise performing a measurement for at least one of a pathloss or a propagation delay to at least one serving base station of the one of more base stations, based, at least in part, on the processing. The UE may perform at least one of: open-loop rate adaptation, power control, or open-loop timing control, based, at least in part, on the processing, the measurement, or a combination thereof, for the transmission of the third message.

Figure 16:
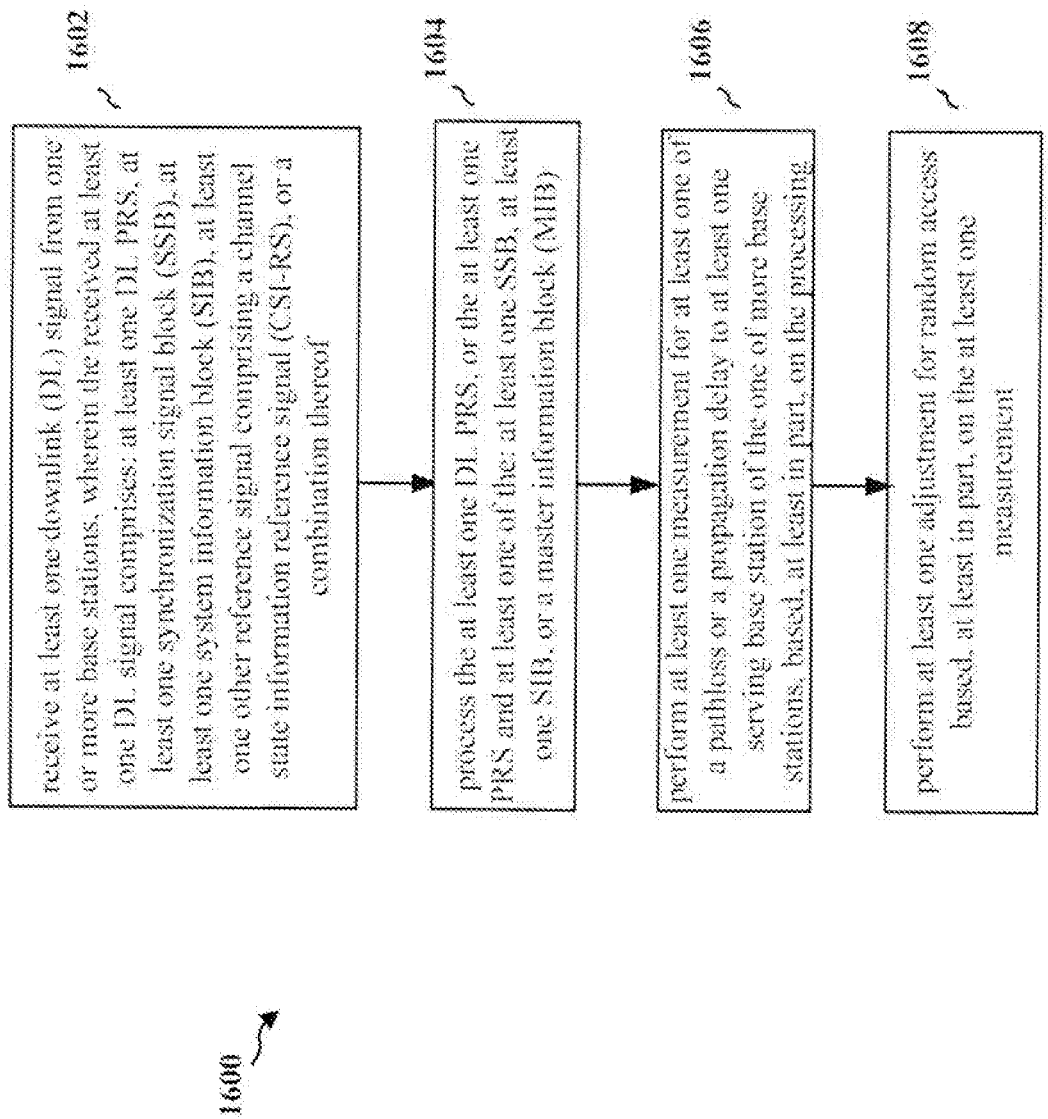
FIG. 16 illustrates example operations for a UE, in accordance with certain aspects of the present disclosure.

FIG. 16 illustrates example operations 1600, e.g., by a UE (such as a UE described in connection with the aforementioned figures), in accordance with certain aspects of the present disclosure. Operations 1600 may begin with a UE receiving at least one downlink (DL) signal from one or more base stations (1602). The received at least one DL signal may comprise: at least one DL PRS, at least one synchronization signal block (SSB), at least one system information block (SIB), at least one other reference signal comprising a channel state information reference signal (CSI-RS), or a combination thereof. The UE may process the at least one DL PRS, or the at least one PRS and at least one of the: at least one SSB, at least one SIB, or a master information block (MIB) (1604). The UE may perform at least one measurement for at least one of a pathloss or a propagation delay to at least one serving base station of the one of more base stations, based, at least in part, on the processing (1606). The UE, or a BS, may perform at least one adjustment for random access based, at least in part, on the at least one measurement (1608). The at least one adjustment may include, for example, time control, power control, resource selection, or link adaptation.

In an aspect, perform the at least one measurement may be based, at least in part, on observed time difference of arrival (OTDOA) based on the at least one serving base station and at least one neighbor base station, of the one or more base stations.

In an aspect, performing the at least one measurement may be based, at least in part, on at least one of a DL received power or a time of arrival (ToA), based on the at least one serving base station of the one or more base stations.

In an aspect, the UE may perform at least one of: modulation and coding scheme (MCS) selection, resource allocation, timing control, or power control, for a first message to initiate the random access based, at least in part, on the processing, the at least one measurement, or both.

In an aspect, the UE may perform at least one of: uplink (UL) power control, timing control, resource selection, or link adaptation, based at least in part on the processing, the at least one measurement, or both.

In an aspect, the resource allocation may comprise at least one of preamble selection or resource mapping for the first message, and wherein the performing the preamble selection or the resource mapping is based, at least in part, on a payload size, the MCS selection, a buffer status, or a state of the UE.

In an aspect, the DL received power or the ToA may be based, at least in part, on PRS transmission from the serving base station, of the one or more base stations, and wherein information for the PRS transmission is signaled by a SIB, a radio resource control (RRC) configuration, a data structure for a format of the PRS transmission, or a combination thereof.

In an aspect, information associated with a mapping between the DL received power and a propagation distance may be signaled by a SIB, and wherein the mapping is based, at least in part, on a carrier frequency, a cell deployment, or a combination thereof.

Figure 17:
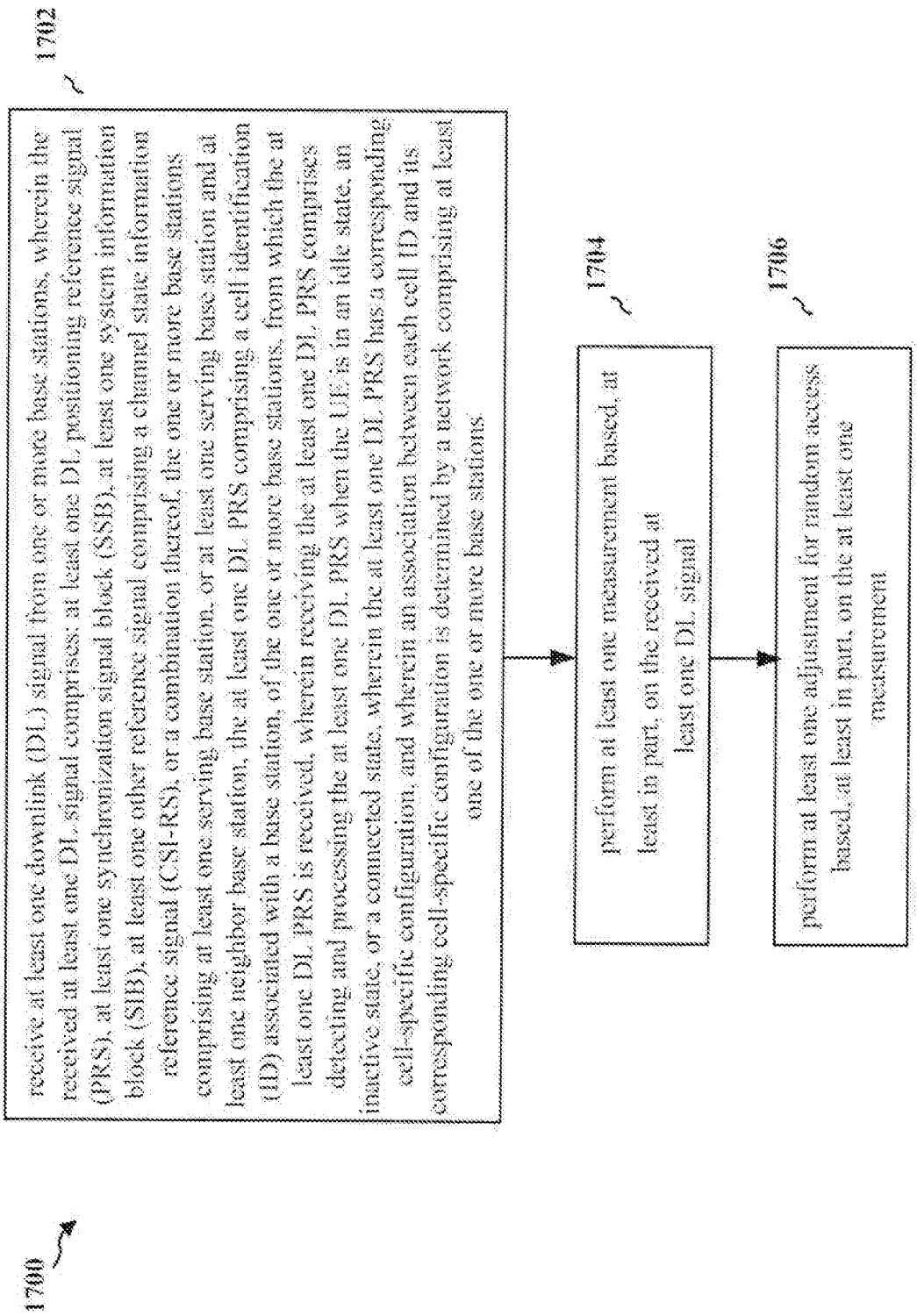
FIG. 17 illustrates example operations for a UE, in accordance with certain aspects of the present disclosure.

FIG. 17 illustrates example operations 1700, e.g., by a UE (such as a UE described in connection with the aforementioned figures), in accordance with certain aspects of the present disclosure. Operations 1700 may begin with a UE receiving at least one downlink (DL) signal from one or more base stations (1702). The received at least one DL signal may comprise: at least one DL positioning reference signal (PRS), at least one synchronization signal block (SSB), at least one system information block (SIB), at least one other reference signal comprising a channel state information reference signal (CSI-RS), or a combination thereof. The one or more base stations may comprise at least one serving base station, or at least one serving base station and at least one neighbor base station. The at least one DL PRS may comprise a cell identification (ID) associated with a base station, of the one or more base stations, from which the at least one DL PRS is received. Receiving the at least one DL PRS may comprise detecting and processing the at least one DL PRS when the UE is in an idle state, an inactive state, or a connected state. The at least one DL PRS may have a corresponding cell-specific configuration. An association between each cell ID and its corresponding cell-specific configuration may be determined by a network comprising at least one of the one or more base stations. The UE may perform at least one measurement based, at least in part, on the received at least one DL signal (1704). The UE, or a BS, may perform at least one adjustment for random access based, at least in part, on the at least one measurement (1706). The at least one adjustment may include, for example, time control, power control, resource selection, or link adaptation.

In an aspect, the UE may receive a schedule for the DL PRS transmission from the network.

In an aspect, random access occasions comprising time resources, frequency resources, beamforming resources, or a combination thereof, may be scheduled by the network together with the schedule for the DL PRS transmission.

FIG. 18 illustrates example operations 1800, e.g., by a BS (such as a BS described in connection with the aforementioned figures), in accordance with certain aspects of the present disclosure. Operations 1800 may include the BS transmitting at least one downlink (DL) signal to a user equipment (UE) or receiving at least one uplink (UL) positioning reference signal (PRS) from the UE (1802). The transmitted at least one DL signal may comprise: at least one positioning reference signal (PRS), at least one synchronization signal block (SSB), at least one system information block (SIB), at least one other reference signal comprising a channel state information reference signal (CSI-RS), or a combination thereof. At least one measurement is performed based, at least in part, on the at least one DL signal or the at least one UL PRS. For example, a measurement may be performed based, at least in part, on the at least one DL signal by the UE. For example, a measurement may be performed based, at least in part, on the at least one UL PRS signal by the BS. The UE, or a BS, may perform at least one adjustment for random access with the BS based, at least in part, on the at least one measurement. The at least one adjustment may include, for example, time control, power control, resource selection, or link adaptation.

In as aspect, the BS may receive a first message from the UE to initiate the random access, the first message comprising a preamble and a payload, and may transmit, in response to the first message, a second message associated with completion of the random access.

In an aspect, the UE may receive a first message from the UE to initiate the random access, the first message comprising a preamble, may transmit, in response to the first message, a second message associated with a random access response, may receive a third message from the UE in response to the second message, the third message comprising information transmitted on an uplink shared channel, and may transmit a fourth message, in response to the third message, associated with completion of the random access.

In an aspect, a triggering event for the random access may be based, at least in part, on the at least one DL PRS or the at least one UL PRS.

In an aspect, the at least one DL PRS may comprise a cell identification (ID) associated with the BS and has a corresponding cell-specific configuration.

In an aspect, a format of the at least one DL PRS may be based, at least in part, on at least one of a cell identification (ID) or a power class of the BS.

In an aspect, power class information for the BS may be indicated by the SIB, a format of the at least one DL PRS or UL PRS, or a combination thereof.

In an aspect, the at least one measurement may be performed based, at least in part, on observed time difference of arrival (OTDOA) based on at least the BS, wherein the BS may be a serving BS for the UE, and at least one neighbor BS.

In an aspect, the OTDOA may be based, at least in part, on PRS transmission from the BS and the at least one neighbor BS, wherein the PRS transmission may be coordinated by a network comprising the BS and the at least one neighbor BS.

In an aspect, the at least one adjustment may comprise performing timing control, power control, resource selection, link adaptation, or any combination thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. The word "exemplary" is used herein to mean "serving as an example, instance, or illustration." Any aspect described herein as "exemplary" is not necessarily to be construed as preferred or advantageous over other aspects. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.). As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for performing, means for processing, means for indicating, means for measuring, means for estimating, means for identifying, means for determining, means for enabling, means for selecting, means for transmitting, means for receiving, means for sending, means for mapping, means for synchronizing, means for comparing, means for prioritizing, means for assigning, means for allocating, means for rejecting, means for restricting, means for increasing, and/or means for decreasing may include one or more processors/controllers, transmitters, receivers, antennas, and/or other modules, components, or elements of, for example, user equipment 104, 350, 850, 1002/1002', base station 102, 180, 310, 802/802', and/or another network entity. The words "module," "mechanism," "element," "device," and the like may not be a substitute for the word "means." As such, no claim element is to be construed as a means plus function unless the element is expressly recited using the phrase "means for."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. One or more aforementioned devices or processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication by a user equipment (UE), comprising:
    receiving at least one downlink (DL) signal from one or more base stations or transmitting at least one uplink (UL) positioning reference signal (PRS), the received at least one DL signal comprising: at least one DL PRS, at least one synchronization signal block (SSB), at least one system information block (SIB), at least one other reference signal comprising a channel state information reference signal (CSI-RS), or a combination thereof, wherein at least one measurement is performed based, at least in part, on the received at least one DL signal or the transmitted at least one UL PRS;
    performing at least one adjustment for random access based, at least in part, on the at least one measurement;
    transmitting a first message to at least one base station of the one or more base stations to initiate the random access, the first message comprising a preamble and a payload, wherein the preamble is transmitted on a random access channel (RACH), and the payload is transmitted on at least one of an uplink control channel or an uplink shared channel; and
    receiving a second message associated with completion of the random access, the second message transmitted by the at least one base station in response to the first message, wherein the second message includes control information in a DL control channel and data in a DL shared channel.

2. The method of claim 1, wherein a triggering event for the random access is based, at least in part, on the at least one DL PRS or the at least one UL PRS.

3. The method of claim 1, wherein the at least one DL PRS or the at least one UL PRS is transmitted periodically, semi-periodically, or based on a configured pattern.

4. The method of claim 1, wherein a format of the at least one DL PRS is based, at least in part, on at least one of a power class or a beam forming gain of a base station, of the one or more base stations, transmitting the at least one DL PRS, and wherein power class information for the base station is indicated by at least one of: a system information block (SIB), a format of the at least one DL PRS, or a combination thereof.

5. The method of claim 1, wherein the at least one UL PRS, and a random access preamble, transmitted by the UE in the first message to initiate the random access, occupy the same time resources, the same frequency resources, or a combination thereof.

6. A method for wireless communication by a user equipment (UE), comprising:
    receiving at least one downlink (DL) signal from one or more base stations or transmitting at least one uplink (UL) positioning reference signal (PRS), the received at least one DL signal comprising: at least one DL PRS, at least one synchronization signal block (SSB), at least one system information block (SIB), at least one other reference signal comprising a channel state information reference signal (CSI-RS), or a combination thereof, wherein at least one measurement is performed based, at least in part, on the received at least one DL signal or the transmitted at least one UL PRS;

performing at least one adjustment for random access based, at least in part, on the at least one measurement;

transmitting a first message to at least one base station of the one or more base stations to initiate the random access, the first message comprising a preamble;

receiving a second message associated with a random access response, the second message transmitted by the at least one base station in response to the first message and comprising a reduced payload size for timing advance;

transmitting a third message in response to the second message, the third message comprising information transmitted on an uplink shared channel; and receiving a fourth message associated with completion of the random access, the fourth message transmitted by the at least one base station in response to the third message.

7. The method of claim 6, further comprising:

processing the at least one DL PRS, or the at least one DL PRS and at least one of: the at least one SSB, the at least one SIB, or a master information block (MIB), wherein performing the at least one measurement comprises performing a measurement for at least one of a pathloss or a propagation delay to at least one serving base station of the one of more base stations, based, at least in part, on the processing; and performing at least one of: open-loop rate adaptation, power control, or open-loop timing control, based, at least in part, on the processing, the measurement, or a combination thereof, for the transmission of the third message.

8. A method for wireless communication by a user equipment (UE), comprising:

receiving at least one downlink (DL) signal from one or more base stations, wherein the received at least one DL signal comprises: at least one DL PRS, at least one synchronization signal block (SSB), at least one system information block (SIB), at least one other reference signal comprising a channel state information reference signal (CSI-RS), or a combination thereof;

processing the at least one DL PRS, or the at least one DL PRS and at least one of the: at least one SSB, at least one SIB, or a master information block (MIB);

performing at least one measurement for at least one of a pathloss or a propagation delay to at least one serving base station of the one of more base stations, based, at least in part, on the processing; and performing at least one adjustment for random access based, at least in part, on the at least one measurement.

9. The method of claim 8, wherein performing the at least one measurement is based, at least in part, on observed time difference of arrival (OTDOA) based on the at least one serving base station and at least one neighbor base station, of the one or more base stations.

10. The method of claim 8, wherein performing the at least one measurement is based, at least in part, on at least one of a DL received power or a time of arrival (ToA), based on the at least one serving base station of the one or more base stations.

11. The method of claim 10, wherein the DL received power or the ToA is based, at least in part, on PRS transmission from the serving base station, of the one or more base stations, and wherein information for the PRS transmission is signaled by a SIB, a radio resource control (RRC) configuration, a data structure for a format of the PRS transmission, or a combination thereof.

12. The method of claim 10, wherein information associated with a mapping between the DL received power and a propagation distance is signaled by a SIB, and wherein the mapping is based, at least in part, on a carrier frequency, a cell deployment, or a combination thereof.

13. The method of claim 8, further comprising:

performing at least one of: modulation and coding scheme (MCS) selection, resource allocation, timing control, or power control, for a first message to initiate the random access based, at least in part, on the processing, the at least one measurement, or both.

14. The method of claim 13, wherein the resource allocation comprises at least one of preamble selection or resource mapping for the first message, and wherein the performing the preamble selection or the resource mapping is based, at least in part, on a payload size, the MCS selection, a buffer status, or a state of the UE.

15. The method of claim 8, further performing at least one of: uplink (UL) power control, timing control, resource selection, or link adaptation, based at least in part on the processing, the at least one measurement, or both.

16. A method for wireless communication by a user equipment (UE), comprising:

receiving at least one downlink (DL) signal from one or more base stations, wherein the received at least one DL signal comprises: at least one DL positioning reference signal (PRS), at least one synchronization signal block (SSB), at least one system information block (SIB), at least one other reference signal comprising a channel state information reference signal (CSI-RS), or a combination thereof, the one or more base stations comprising at least one serving base station, or at least one serving base station and at least one neighbor base station, the at least one DL PRS comprising a cell identification (ID) associated with a base station, of the one or more base stations, from which the at least one DL PRS is received, wherein receiving the at least one DL PRS comprises detecting and processing the at least one DL PRS when the UE is in an idle state, an inactive state, or a connected state, wherein the at least one DL PRS has a corresponding cell-specific configuration, and wherein an association between each cell ID and its corresponding cell-specific configuration is determined by a network comprising at least one of the one or more base stations;

performing at least one measurement based, at least in part, on the received at least one DL signal; and performing at least one adjustment for random access based, at least in part, on the at least one measurement.

17. The method of claim 16, further comprising receiving a schedule for the DL PRS transmission from the network.

18. The method of claim 17, wherein random access occasions comprising time resources, frequency resources, beamforming resources, or a combination thereof, are scheduled by the network together with the schedule for the DL PRS transmission.

19. A method for wireless communication by a base station (BS), comprising transmitting at least one downlink (DL) signal to a user equipment (UE) or receiving at least one uplink (UL) positioning reference signal (PRS) from the UE, the transmitted at least one DL signal comprising: at least one positioning reference signal (PRS), at least one synchronization signal block (SSB), at least one system information block (SIB), at least one other reference signal comprising a channel state information reference signal (CSI-RS), or a combination thereof, wherein at least one measurement is performed based, at least in part, on the at least one DL signal or the at least one UL PRS, and wherein the UE performs at least one adjustment for random access with the BS based, at least in part, on the at least one measurement;

receiving a first message from the UE to initiate the random access, the first message comprising a preamble and a payload, wherein the preamble is transmitted on a random access channel (RACH), and the payload is transmitted on at least one of an uplink control channel or an uplink shared channel; and transmitting a second message associated with completion of the random access, the second message transmitted in response to the first message, wherein the second message includes control information in a DL control channel and data in a DL shared channel.

20. The method of claim 19, wherein a triggering event for the random access is based, at least in part, on the at least one DL PRS or the at least one UL PRS.

21. The method of claim 19, wherein the at least one DL PRS comprises a cell identification (ID) associated with the BS and has a corresponding cell-specific configuration.

22. The method of claim 19, wherein a format of the at least one DL PRS is based, at least in part, on at least one of a cell identification (ID) or a power class of the BS.

23. The method claim 19, wherein power class information for the BS is indicated by the SIB, a format of the at least one DL PRS or UL PRS, or a combination thereof.

24. The method of claim 19, wherein the at least one measurement is performed based, at least in part, on observed time difference of arrival (OTDOA) based on at least the BS, wherein the BS is a serving BS for the UE, and at least one neighbor BS.

25. The method of claim 24, wherein the OTDOA is based, at least in part, on PRS transmission from the BS and the at least one neighbor BS, wherein the PRS transmission is coordinated by a network comprising the BS and the at least one neighbor BS.

26. The method of claim 19, wherein the at least one adjustment comprises performing timing control, power control, resource selection, link adaptation, or any combination thereof.

27. A method for wireless communication by a base station (BS), comprising transmitting at least one downlink (DL) signal to a user equipment (UE) or receiving at least one uplink (UL) positioning reference signal (PRS) from the UE, the transmitted at least one DL signal comprising: at least one positioning reference signal (PRS), at least one synchronization signal block (SSB), at least one system information block (SIB), at least one other reference signal comprising a channel state information reference signal (CSI-RS), or a combination thereof, wherein at least one measurement is performed based, at least in part, on the at least one DL signal or the at least one UL PRS, and wherein the UE performs at least one adjustment for random access with the BS based, at least in part, on the at least one measurement;

receiving a first message from the UE to initiate the random access, the first message comprising a preamble;

transmitting, in response to the first message, a second message associated with a random access response, receiving a third message from the UE in response to the second message, the third message comprising information transmitted on an uplink shared channel; and transmitting a fourth message, in response to the third message, associated with completion of the random access.

* * * * *